United States Patent
He

(10) Patent No.: US 11,882,468 B2
(45) Date of Patent: Jan. 23, 2024

(54) TRAFFIC/RATE COUNTING METHOD AND RELATED DEVICE

(71) Applicant: HUAWEI TECHNOLOGIES CO., LTD., Shenzhen (CN)

(72) Inventor: Yanzhao He, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 398 days.

(21) Appl. No.: 17/270,161

(22) PCT Filed: Aug. 21, 2019

(86) PCT No.: PCT/CN2019/101749
§ 371 (c)(1),
(2) Date: Feb. 22, 2021

(87) PCT Pub. No.: WO2020/038398
PCT Pub. Date: Feb. 27, 2020

(65) Prior Publication Data
US 2021/0203581 A1 Jul. 1, 2021

(30) Foreign Application Priority Data

Aug. 22, 2018 (CN) .......................... 201810960704.1
Nov. 30, 2018 (CN) .......................... 201811458672.1

(51) Int. Cl.
*H04L 41/00* (2022.01)
*H04L 41/22* (2022.01)
(Continued)

(52) U.S. Cl.
CPC ............. *H04W 24/08* (2013.01); *H04L 41/20* (2013.01); *H04L 41/22* (2013.01);
(Continued)

(58) Field of Classification Search
CPC ......... H04B 17/0082–409; H04L 41/02–5096; H04L 43/02–55; H04L 47/10–83;
(Continued)

(56) References Cited

U.S. PATENT DOCUMENTS

| 2015/0142985 A1 | 5/2015 | Sharpe et al. |
| 2016/0156708 A1 | 6/2016 | Jalan et al. |

(Continued)

FOREIGN PATENT DOCUMENTS

| CN | 103813356 A | 5/2014 |
| CN | 103841590 A | 6/2014 |

(Continued)

OTHER PUBLICATIONS

3GPP TS 23.503 V15.2.0 (Jun. 2018), 3rd Generation Partnership Project; Technical Specification Group Services and System Aspects;Policy and Charging Control Framework for the 5G System;Stage 2(Release 15), total 67 pages.

(Continued)

*Primary Examiner* — Timothy J Weidner
(74) *Attorney, Agent, or Firm* — Rimon PC

(57) ABSTRACT

A network traffic/rate counting method includes: obtaining first session information of a first session of a terminal device, where the first session information includes: a slice of the first session, a slice type of a slice of the first session, a data network name DNN of the first session, or an access network AN used by the first session; and counting traffic of the first session into first slice traffic corresponding to the slice to which the first session belongs, or into first type slice traffic corresponding to the slice type of the slice to which the first session belongs, or into first DNN traffic corresponding to the DNN to which the first session belongs, or into first AN traffic corresponding to the AN.

20 Claims, 24 Drawing Sheets

(51) Int. Cl.
  *H04L 43/0829* (2022.01)
  *H04L 43/0882* (2022.01)
  *H04L 43/0894* (2022.01)
  *H04L 43/16* (2022.01)
  *H04W 24/08* (2009.01)
  *H04W 24/10* (2009.01)
  *H04W 76/22* (2018.01)
  *H04W 76/25* (2018.01)
  *H04W 84/02* (2009.01)
  *H04W 88/02* (2009.01)
  *H04W 88/18* (2009.01)
  *H04W 92/02* (2009.01)

(52) U.S. Cl.
  CPC ...... *H04L 43/0829* (2013.01); *H04L 43/0882* (2013.01); *H04L 43/0894* (2013.01); *H04L 43/16* (2013.01); *H04W 24/10* (2013.01); *H04W 76/22* (2018.02); *H04W 76/25* (2018.02); *H04W 84/02* (2013.01); *H04W 88/02* (2013.01); *H04W 88/18* (2013.01); *H04W 92/02* (2013.01)

(58) Field of Classification Search
  CPC ...... H04L 67/12–148; H04W 4/30–70; H04W 8/18–245; H04W 24/02–10; H04W 28/02–26; H04W 36/0005–385; H04W 48/02–20; H04W 60/005–06; H04W 72/02–569; H04W 76/10–50; H04W 80/02–12; H04W 84/005–22; H04W 88/005–188; H04W 92/02–24
  See application file for complete search history.

(56) References Cited

U.S. PATENT DOCUMENTS

2016/0330669 A1   11/2016  Li et al.
2016/0352645 A1*  12/2016  Senarath ............. H04L 43/0876
2017/0012846 A1*   1/2017  Chen ................... H04L 43/0876
2017/0163545 A1    6/2017  Jing et al.
2018/0077023 A1*   3/2018  Zhang ................. H04L 43/0876

FOREIGN PATENT DOCUMENTS

| | | |
|---|---|---|
| CN | 105101290 A | 11/2015 |
| CN | 105323105 A | 2/2016 |
| CN | 106792888 A | 5/2017 |
| CN | 106921588 A | 7/2017 |
| CN | 107111597 A | 8/2017 |
| CN | 107113243 A | 8/2017 |
| CN | 108282351 A | 7/2018 |
| EP | 3160184 A1 | 4/2017 |
| WO | 2018137699 A1 | 8/2018 |
| WO | WO-2018142021 A1 * | 8/2018 ............. H04W 4/24 |

OTHER PUBLICATIONS

3GPP TS 23.502 V15.2.0 (Jun. 2018), 3rd Generation Partnership Project; Technical Specification; Procedures for the 5G System;(Release 15),ETSI TS 123 502, total 311 pages.

3GPP TS 24.501 V15.0.0 (Jul. 2018), 3rd Generation Partnership Project; Technical Specification; 5G; Non-Access-Stratum (NAS) protocol for 5G System (5GS);Stage 3(Release 15), ETSI TS 124 501, total 337 pages.

C1-182392, China Mobile, Re-establishment of QoS Flow used for SIP signalling, 3GPP TSG-CT WG1 Meeting #110, Kunming (P.R. of China), Apr. 16-20, 2018, total 5 pages.

C1-186921, BlackBerry UK Ltd., Correct emergency call setup procedures by taking into account EMCN3, 3GPP TSG-CT WG1 Meeting #112bis, Vilnius (Lithuania), Oct. 15-19, 2018, total 13 pages.

Zhang Yuan-yuan et al., New Method for User's QoS Requirement Network Selection in Heterogeneous Wireless Networks, Computer Science, vol. 42, No. 3, Mar. 2015, with an English Abstract, total 5 pages.

Wang Rui et al, Survey of 5G network slicing, Journal of Nanjing University of Posts and Telecommunications ( Natural Science Edition), vol. 38, No. 5, Oct. 2018, with an English Abstract, total 9 pages.

* cited by examiner

5G traffic management

Enhanced mobile broadband (eMBB) network traffic usage

Ultra-reliable and low latency (URLLC) network traffic usage

Massive machine type communications (mMTC) network traffic usage

Network traffic usage of each DNN

Network traffic usage of each RAT

Traffic usage of each application

CONT. FROM FIG. 2A

CONT. FROM FIG. 2A

5G traffic management

Network traffic usage of each application

Traffic usage of APP 1

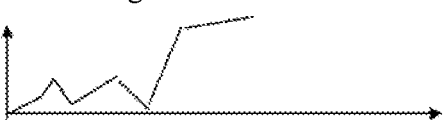

Traffic used this month: uplink x MB, downlink y MB

Use network 1: uplink x MB, downlink y MB

Use network 2: uplink x MB, downlink y MB

Use LADN: uplink x MB, downlink y MB

Use non-LADN: uplink x MB, downlink y MB

Use NR for connection: uplink x MB, downlink y MB

Use WiFi+5G network: uplink x MB, downlink y MB

Use WiFi network: uplink x MB, downlink y MB

Traffic usage of APP 2

CONT. FROM FIG. 3A

5G subnet quality management

Enhanced mobile broadband (eMBB) network speed display

Ultra-reliable and low latency communications (URLLC) network speed display

Massive machine type communications (mMTC) network speed display

Network quality display for each network interface card ⊚

☐ Display total rate on status bar

☐ Display classified network speeds in floating window

CONT. FROM FIG. 3A

Network quality for each network interface card in 5G

Network quality of network interface card 1

Current network speed: uplink x MB/s, downlink y MB/s

Maximum packet loss rate: m%

Maximum network speed allowed: uplink, downlink

Guaranteed network speed: uplink, downlink

Packet latency: packet error rate:

APPs supported by this network interface card
    ☐ APP 1
    ☐ APP 2
    ☐ APP 3

Network quality of network interface card 2

TRAFFIC/RATE COUNTING METHOD AND RELATED DEVICE

CROSS-REFERENCE TO RELATED APPLICATIONS

This application is a national stage of International Application No. PCT/CN2019/101749, filed on Aug. 21, 2019, which claims priority to Chinese Patent Application No. 201811458672.1, filed on Nov. 30, 2018, and Chinese Patent Application No. 201810960704.1, filed on Aug. 22, 2018. All of the aforementioned patent applications are hereby incorporated by reference in their entireties.

TECHNICAL FIELD

This application relates to the terminal field, and in particular, to a traffic/rate counting method and a related device.

BACKGROUND

Mobile communications technologies have profoundly changed people's lives, but people's pursuit of mobile communications technologies with higher performance has never stopped. To cope with the explosive growth of mobile data traffic, connections of massive mobile communications devices, and emerging various new services and application scenarios in the future, fifth generation (5G) mobile communications systems emerge at the right moment. The international telecommunication union (ITU) defines three types of application scenarios for 5G and future mobile communications systems: enhanced mobile broadband (eMBB), ultra-reliable and low latency communications (URLLC), and massive machine type communications (mMTC).

Typical URLLC services include wireless control in industrial manufacturing or production processes, motion control of unmanned vehicles and unmanned aircrafts, and tactile interactive applications such as remote repair and remote surgery. These services are mainly characterized by requirements for ultra-high reliability, a low latency, transmission of a smaller amount of data, and burstiness.

Typical mMTC services include power distribution automation of smart grids, smart cities, and the like. These services are mainly characterized by a large quantity of networked devices, transmission of a smaller amount of data, and insensitivity to a data transmission latency. These mMTC terminals need to meet requirements for low costs and quite long standby time.

Typical eMBB services include ultra high definition videos, augmented reality (augmented reality, AR), virtual reality (virtual reality, VR), and the like. These services are mainly characterized by transmission of a large amount of data and a high transmission rate.

Obviously, 5G scenarios are much more complex than previous generations of mobile communications systems. How to design traffic counting that is suitable for the 5G scenarios is an unresolved issue.

SUMMARY

This application provides a traffic/rate counting method and a related device that can be applicable to a complex 5G scenario.

According to a first aspect, a traffic/rate counting method is provided, including:

obtaining first session information of a first session of a terminal device, where the first session information includes any one or more types of the following information: a slice to which the first session belongs, a slice type of a slice to which the first session belongs, a data network name (DNN) to which the first session belongs, or an access network (AN) used by the first session; and when the first session information includes the slice to which the first session belongs, counting traffic/rate of the first session into first-slice traffic/rate corresponding to the slice to which the first session belongs, where the slice to which the first session belongs is a first slice; or when the first session information includes the slice type of the slice to which the first session belongs, counting traffic/rate of the first session into first-type-slice traffic/rate corresponding to the slice type of the slice to which the first session belongs, where the slice type of the slice to which the first session belongs is a first type slice; or when the first session information includes the DNN to which the first session belongs, counting traffic/rate of the first session into first-DNN traffic/rate corresponding to the DNN to which the first session belongs, where the DNN to which the first session belongs is a first DNN; or when the first session information includes the AN used by the first session, counting traffic/rate of the first session into first-AN traffic/rate corresponding to the AN used by the first session, where the AN used by the first session is a first AN.

In the foregoing solutions, the terminal device may implement one or more of the following manners: counting traffic/rates of sessions that belong to a same slice, counting traffic/rates of sessions that belong to a same slice type, counting traffic/rates of sessions that belong to a same DNN, or counting traffic/rates of sessions of a same access network type. In this way, traffic/rate counting can adapt to requirements of more complex 5G scenarios.

In a possible embodiment, when the first session information includes the slice to which the first session belongs, the slice to which the first session belongs is the first slice, and a plurality of sessions including the first session all belong to the first slice, traffic/rates of the plurality of sessions is/are counted into the first-slice traffic/rate;

when the first session information includes the slice type of the slice to which the first session belongs, the slice type of the slice to which the first session belongs is the first type slice, and a plurality of sessions including the first session all belong to the first type slice, traffic/rates of the plurality of sessions is/are counted into the first-type-slice traffic/rate;

when the first session information includes the DNN to which the first session belongs, the DNN to which the first session belongs is the first DNN, and a plurality of sessions including the first session all belong to the first DNN, traffic/rates of the plurality of sessions is/are counted into the first-DNN traffic/rate; or when the first session information includes the AN used by the first session, the AN used by the first session is the first AN, and a plurality of sessions including the first session all belong to the first AN, traffic/rates of the plurality of sessions is/are counted into the first-AN traffic/rate.

In a possible embodiment, the method includes: displaying, on a display interface, a network quality indicator of one or more sessions including the first session or one or more applications supported by the one or more sessions; or displaying, on a display interface, network quality indicators of one or more slice types including the first slice type or one or more applications supported by one or more slices; or displaying, on a display interface, network quality indicators of one or more slices including the first slice or one or more applications supported by the one or more slices; or displaying, on a display interface, network quality indicators of one or more DNNs including the first DNN or one or more applications supported by the one or more DNNs; or displaying, on a display interface, network quality indicators of one or more ANs including the first AN or one or more applications supported by the one or more ANs.

In the foregoing solutions, the terminal device may display, on the display interface, the network quality indicator of the session, the slice, or the DNN, and the applications supported by the session, the slice, and the DNN, so that a user can better understand statuses of the session, the slice, and the DNN.

In a possible embodiment, the method includes: when the applications supported by the first session are displayed on the display interface, receiving a first instruction entered by a user, and deselecting, according to the first instruction, some or all of the applications supported by the first session; or when the slice to which the first session belongs is displayed on the display interface, receiving a second instruction entered by a user, and deselecting, according to the second instruction, some or all of the applications supported by the slice to which the first session belongs; or when the slice type to which the first session belongs is displayed on the display interface, receiving a third instruction entered by a user, and deselecting, according to the third instruction, some or all of the applications supported by the slice type to which the first session belongs; or when the DNN to which the first session belongs is displayed on the display interface, receiving a fourth instruction entered by a user, and deselecting, according to the fourth instruction, some or all of the applications supported by the DNN to which the first session belongs; or when the AN to which the first session belongs is displayed on the display interface, receiving a fifth instruction entered by a user, and deselecting, according to the fifth instruction, some or all of the applications supported by the AN to which the first session belongs.

In the foregoing solutions, the terminal device may deselect some or all of the applications based on the network quality indicators of the session, the slice, and the DNN, thereby improving network quality.

In a possible embodiment, the network quality indicator includes one or more of a priority, a packet latency, a packet error rate, an aggregate maximum bit rate AMBR, a guaranteed flow bit rate GFBR, a maximum flow bit rate MFBR, and a maximum packet loss rate.

In a possible embodiment, the method includes: obtaining the traffic of the first session through a traffic/rate interface, where the traffic/rate interface is an original interface or a new interface; and obtaining network quality of the first session through a quality interface, where the quality interface is a new interface.

In a possible embodiment, the method includes: displaying, on the display interface, network quality indicators of one or more candidate network interfaces related to a first application, where the one or more candidate network interfaces are network interfaces that can be selected for the first application; receiving a target network interface selected by the user from the candidate network interfaces based on the network quality indicators of the candidate network interfaces; and binding the first application to the target network interface; or displaying, on the display interface, network quality requirements of one or more candidate applications related to a first network interface, where the one or more candidate applications are applications that can be selected for the first network interface; receiving a target application selected by the user from the candidate applications based on the network quality requirements; and binding the first network interface to the target application; or displaying, on the display interface, network quality indicators of one or more candidate slices related to a first application, where the one or more slices are slices that can be selected for the first application; receiving a target slice selected by the user from the candidate slices based on the network quality indicators of the candidate slices; and binding the first application to the target slice; or displaying, on the display interface, network quality requirements of one or more candidate applications related to the first slice, where the one or more candidate applications are applications that can be selected for the first slice; receiving a target application selected by the user from the candidate applications based on the network quality requirements; and binding the first slice to the target application; or displaying, on the display interface, network quality indicators of one or more candidate DNNs related to a first application, where the one or more candidate DNNs are DNNs that can be selected for the first application; receiving a target DNN selected by the user from the candidate DNNs based on the network quality indicators of the candidate DNNs; and binding the first application to the target DNN; or displaying, on the display interface, network quality requirements of one or more candidate applications related to the first DNN, where the candidate applications are applications that can be selected for the first DNN; receiving a target application selected by the user from the candidate applications based on the network quality requirements; and binding the first DNN to the target application; or displaying, on the display interface, network quality indicators of one or more candidate ANs related to a first application, where the candidate ANs are ANs that can be selected for the first application; receiving a target AN selected by the user from the candidate ANs based on the network quality indicators of the candidate ANs; and binding the first application to the target AN; or displaying, on the display interface, network quality requirements of one or more candidate applications related to the first AN, where the candidate applications are applications that can be selected for the first AN; receiving a target application selected by the user from the candidate applications based on the network quality requirements; and binding the first AN to the target application.

In the foregoing solutions, the user may select a suitable target session, a suitable target network interface, a suitable target slice, a suitable target DNN, or a suitable target AN for an application based on the network quality indicators of the sessions, the network interfaces, the slices, the DNNs, or the ANs.

In a possible embodiment, the method includes: when the first-slice traffic is greater than or equal to or close to an upper slice traffic limit, stopping using the first-slice traffic;

when the first-type-slice traffic is greater than or equal to or close to an upper slice type traffic limit, stopping using the first-type-slice traffic;

when the first-DNN traffic is greater than or equal to or close to an upper DNN traffic limit, stopping using the first-DNN traffic; or when the first-AN traffic is greater than or equal to or close to an upper AN traffic limit, stopping using the first-AN traffic.

In the foregoing solutions, the terminal device may stop using the first-slice traffic, the first-type-slice traffic, the first-DNN traffic, or the first-AN traffic when the first-slice traffic, the first-type-slice traffic, the first-DNN traffic, or the first-AN traffic is greater than or equal to or close to the upper traffic limit respectively. This prevents unnecessary fees caused by exceeding the upper traffic limit.

According to a second aspect, a terminal device is provided, where the terminal device includes a unit that can implement the method described in any embodiment of the first aspect.

According to a third aspect, a terminal device is provided, including a processor and a memory, where the processor executes code in the memory to perform the method described in any embodiment of the first aspect.

According to a fourth aspect, a computer non-volatile storage medium is provided, including an instruction. When the instruction is run on a terminal device, the terminal device is enabled to perform the method described in any embodiment of the first aspect.

According to a fifth aspect, a computer program product is provided. When the computer program product is read and executed by a computer, the method described in any embodiment of the first aspect is performed.

According to a sixth aspect, an apparatus is provided, applied to a terminal device. The apparatus is coupled to a memory, and is configured to read and execute a software program stored in the memory, so that the terminal device implements the method described in any embodiment of the first aspect. The apparatus is a chip or an on-chip processing system.

BRIEF DESCRIPTION OF DRAWINGS

To describe the technical solutions in the embodiments of this application or in the background more clearly, the following briefly describes the accompanying drawings for describing the embodiments of this application or the background.

FIG. 2A and FIG. 2B are schematic diagrams of a type of traffic display interface according to this application;

FIG. 3A and FIG. 3B are a schematic diagrams of a type of rate display interface according to this application;

DESCRIPTION OF EMBODIMENTS

Figure 1:
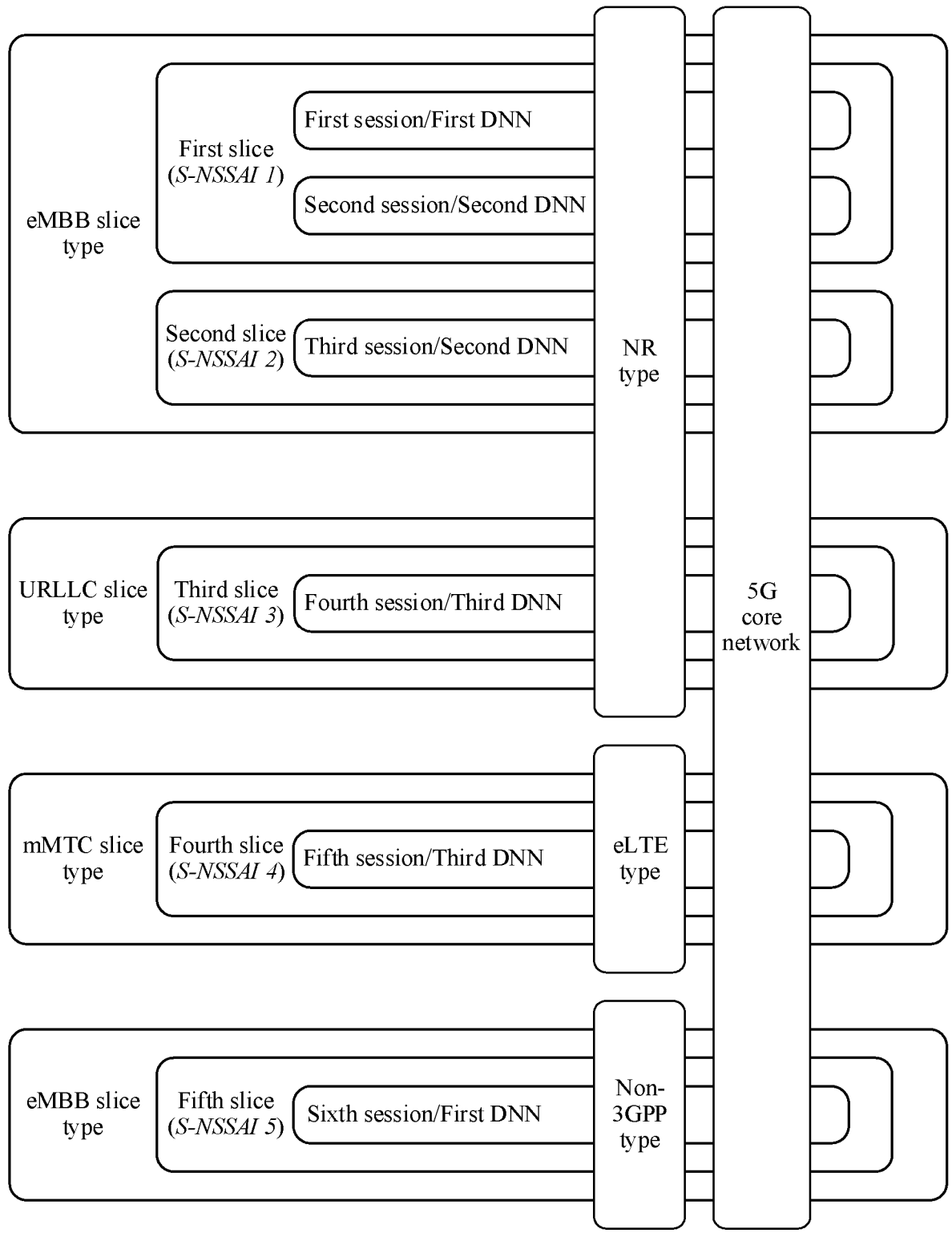
FIG. 1 is a diagram of relationships between a session and a slice, a slice type, a DNN, and an AN according to this application.

A terminal device may be an entity used for receiving or transmitting a signal on a user side, for example, new generation user equipment (gUE). The terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, a user apparatus, or the like. The terminal device may be a station (ST) in a wireless local area network (LAN), and may be a cellular phone, a cordless phone, a session initiation protocol (SIP) phone, a wireless local loop (WLL) station, a personal digital assistant (PDA) device, a handheld device or computing device that has a wireless communications function, or another processing device, vehicle-mounted device, or wearable device that is connected to a wireless modem, and a terminal device in a next generation communications system, such as a terminal device in a fifth-generation (5G) communications network, a terminal device in a future evolved public land mobile network (PLMN), a terminal device in a new radio (NR) communications system, and the like. As an example and not a limitation, in the embodiments of the present invention, the terminal device may alternatively be a wearable device. The wearable device may also be referred to as a wearable smart device, and is a general term of wearable devices produced by applying a wearable technology to intelligent design and development of daily wear, such as glasses, gloves, a watch, clothing, and shoes. The wearable device is a portable device that is directly worn on the body or integrated into a user's clothing or accessory. The wearable device not only is a hardware device, but also implements powerful functions through software support, data interaction, and cloud interaction. In a broad sense, the wearable smart devices include those that are fully functional and large-sized, and can implement a complete or partial function without relying on a smartphone, for example, a smart watch or smart glasses, and those that focus only on a specific type of application function and need to be used with another device such as a smartphone, for example, various types of smart bands and smart jewelries for physical sign monitoring.

The following separately describes in detail four application scenarios of a slice, a slice type, a DNN, and an AN in which a terminal device needs to count traffic.

In a 5G communications system, a physical network of an operator may be divided into a plurality of slices based on different quality of service, for example, a latency, a bandwidth, security, and reliability, to flexibly cope with different network application scenarios. The slice has a unique identifier S-NSSAI. That is, different slices can be identified by using S-NSSAIs. Different slices can be leased to users in different industries (such as app vendors and enterprise users) and virtual operators, and alternatively, can directly provide users with different services (for example, using different slices for data and voice services). In addition, terminal consumers can also use a plurality of slices as required. Each slice has different package tariffs and different QoS. It may be understood that different slices have different quality of service. Therefore, fees for different slices are different. A user of a terminal device needs to know traffic usage of each slice for the terminal device, to avoid incurring unnecessary fees.

In a 5G communications system, slices having a same or similar characteristic may be classified into a same slice type. For example, to meet requirements of three types of application scenarios, slice types of slices of an operator may be correspondingly classified into a URLLC slice type, an mMTC slice type, an eMBB slice type, and the like. A slice of the URLLC slice type can satisfy characteristics of high reliability, a low latency, transmission of a smaller amount of data, and burstiness in a URLLC application scenario. A slice of the mMTC slice type can satisfy characteristics of a large quantity of networked devices, transmission of a smaller amount of data, and insensitivity to a data transmission latency in an mMTC application scenario. A slice of the eMBB slice type can satisfy characteristics of transmission of a large amount of data and a high transmission rate in an eMBB application scenario. It may be understood that the foregoing slice type division is merely an example. In another embodiment, the slice type division may be alternatively performed in another manner, for example, based on a financial application scenario or a game application scenario. This is not specifically limited herein. It may be understood that different slice types have different quality of service. Therefore, fees for different slice types are different. A user of a terminal device needs to know traffic usage of each slice type for the terminal device, to avoid incurring unnecessary fees.

In a 5G communications system, free network coverage, that is, a DNN, may be provided for some customers in different areas of the 5G communications system. When the customers in the coverage areas use the DNN through specific apps, their traffic may be free of charge. For example, a company A provides DNN coverage in an area M. In this case, when employees of the company A use a DNN to communicate in the area M through the company's communication software, their traffic may be free of charge. The DNN has a unique identifier, and different DNNs may be identified by using identifiers of the DNNs. It may be understood that traffic generated by a terminal device for using a DNN is free of charge. Therefore, a specific app installed on the terminal device may collect traffic usage of the DNN for the terminal device, to avoid abuse of the DNN traffic.

In a 5G communications system, a 5G network may be connected by using different access networks ANs. For example, a terminal device may be connected to the 5G network by using eLTE, may be connected to the 5G network by using NR, or may be connected to the 5G network by using non-3GPP. This is not specifically limited herein. Costs of non-3GPP network deployment are comparatively low. Therefore, fees of traffic generated for connecting to the 5G network by using the non-3GPP are comparatively low. Costs of NR network deployment are comparatively high. Therefore, fees of traffic generated for connecting to the 5G network by using the NR are comparatively high. The eLTE lies between the two. It may be understood that fees generated for the terminal device to connect to the 5G network by using different ANs are different. A user of the terminal device needs to know traffic usage of the terminal device for connecting to the 5G network by using different ANs, to avoid incurring unnecessary fees.

It should be understood that the foregoing four traffic counting application scenarios are merely used as examples. In another embodiment, another traffic counting application scenario may also be included, for example, 5G and non-5G traffic counting. This is not specifically limited herein.

The following separately describes relationships between a session and a slice, a slice type, a DNN, and an AN. The following relationships exist between a session and a slice, a slice type, a DNN, and an AN separately: A plurality of sessions may belong to a same slice; a plurality of sessions may belong to a same slice type; a plurality of sessions may belong to a same DNN; and a plurality of sessions may belong to a same AN.

A plurality of sessions may belong to a same slice. The relationship between a slice and a session may be shown in FIG. 1, in which a horizontal block at a middle layer is used to represent a slice, and a horizontal block at an inner layer is used to represent a session; and the horizontal block at the middle layer includes a plurality of horizontal blocks at the inner layer, indicating that sessions belong to a slice. Using a first slice in FIG. 1 as an example, a horizontal block representing the first slice includes a horizontal block representing a first session and a horizontal block representing a second session, which is used to indicate that the first session and the second session belong to the first slice.

A plurality of sessions may belong to a same slice type. The relationship between a slice type and a session may be shown in FIG. 1, in which a horizontal block at an outer layer is used to represent a slice type, and the horizontal block at the inner layer is used to represent a session; and the horizontal block at the outer layer includes a plurality of horizontal blocks at the inner layer, indicating that sessions belong to a slice type. Using an eMBB slice type in FIG. 1 as an example, a block representing the eMBB slice type includes the horizontal block representing the first session, the horizontal block representing the second session, a horizontal block representing a third session, and a horizontal block representing a sixth session, which is used to indicate that the first session, the second session, the third session, and the sixth session belong to the eMBB slice type.

A plurality of sessions may belong to a same DNN. The relationship between a DNN and a session may be shown in FIG. 1, in which a left side of a slash "/" in the horizontal block at the inner layer represents a session, and a right side of the slash "/" in the horizontal block at the inner layer represents a DNN to which the session belongs. The right side of the slash "/" in the horizontal block at the inner layer represents that the DNN, to which the session belongs, is duplicate, which indicates that the session belongs to the DNN. Using a first DNN in FIG. 1 as an example, the first DNN is on right sides of slashes "/" in both the horizontal block representing the first session and the horizontal block representing the sixth session, which is used to indicate that the first session and the sixth session belong to the first DNN.

A plurality of sessions may belong to a same AN. The relationship between an AN and a session may be shown in FIG. 1, in which a vertical block on the left represents an AN, and a vertical block on the right represents a 5G core network; and the vertical blocks on the left and right jointly indicate that a terminal device is connected to the 5G core network represented by the vertical block on the right by using the access network represented by the vertical block on the left. The vertical block on the left crosses a plurality of horizontal blocks that represent sessions, indicating that the sessions belong to the AN. Using NR in FIG. 1 as an example, a vertical block representing the NR crosses the horizontal block representing the first session, the horizontal block representing the second session, the horizontal block representing the third session, and a horizontal block representing a fourth session, which is used to indicate that the first session, the second session, the third session, and the fourth session belong to the NR.

It should be understood that FIG. 1 is merely used as an example of relationships between a slice, a slice type, a DNN, and an AN. In another embodiment, the relationships between a slice, a slice type, a DNN, and an AN may alternatively be implemented in another form. This is not specifically limited herein.

When the terminal device creates a session, the terminal device generates corresponding session information for the session. The following describes content of the session information of the session in detail.

Corresponding to the four application scenarios of a slice, a slice type, a DNN, and an AN, the content of the session information of the session may include any one or more types of the following information: a slice to which the session belongs, a slice type of a slice to which the session belongs, a data network name DNN to which the session belongs, or an access network AN used by the session. In the example shown in FIG. 1, a slice to which the first session belongs is the first slice, a slice type of the slice to which the first session belongs is the eMBB slice type, a DNN to which the first session belongs is a DNN 1, and an AN used by the first session is the NR. Therefore, session information of the first session may be represented as (session 1, S-NSSAI 1, eMBB, DNN 1, NR), where the session 1 is used to represent the first session, the S-NSSAI 1 is used to indicate that the first session belongs to the first slice, the eMBB is used to indicate that the slice type of the slice to which the first session belongs is the eMBB type, the DNN 1 is used to indicate that the DNN to which the first session belongs is the first DNN, and the NR is used to indicate that the AN to which the first session belongs is the NR. It should be understood that the foregoing session information is merely used as an example. In another embodiment, the session information may further include a network type to which the session information belongs. The network type is used to indicate whether the session belongs to 5G, non-5G, or the like. This is not specifically limited herein.

After generating the session information, the terminal device may obtain session information in the following manners.

The terminal device may obtain the session information through an original traffic interface or obtain the session information through a new traffic interface. The terminal device originally has a function of obtaining traffic of a session through the original traffic interface, but the terminal device cannot obtain session information of the session through the original traffic interface. Therefore, a function of the original traffic interface may be extended for the terminal device, so that the original traffic interface has a function of obtaining session information of a session. Alternatively, a new interface may further be added to the terminal device, and the new interface is enabled to have a function of obtaining session information of a session. To be specific, the terminal device may obtain traffic of a session through the original traffic interface, and obtain session information of the session through the new interface. It should be understood that the foregoing manners of obtaining the session information are merely used as examples, and should not constitute a specific limitation.

After obtaining the session information of the session, the terminal device counts traffic of the session based on the session information, that is, counts the traffic of the session into traffic corresponding to the session information. The following illustrates some examples of counting traffic of a session based on session information. A first group is an example of counting slice traffic based on a slice to which a session belongs. A second group is an example of counting type slice traffic based on a slice type of a slice to which a session belongs. A third group is an example of counting DNN traffic based on a DNN to which a session belongs. A fourth group is an example of counting AN traffic based on an AN used by a session.

The first group: Count slice traffic based on a slice to which a session belongs.

Using FIG. 1 as an example, the slice to which the first session belongs is the first slice, and a slice to which the second session belongs is the first slice. The terminal device may count traffic of the first session and traffic of the second session into traffic of the first slice. In other words, the traffic of the first slice is equal to a sum of the traffic of the first session and the traffic of the second session.

Using FIG. 1 as an example, a slice to which the third session belongs is a second slice. The terminal device may count traffic of the third session into traffic of the second slice. In other words, the traffic of the second slice is equal to the traffic of the third session.

Using FIG. 1 as an example, a slice to which the fourth session belongs is a third slice. The terminal device may count traffic of the fourth session into traffic of the third slice. In other words, the traffic of the third slice is equal to the traffic of the fourth session.

Using FIG. 1 as an example, a slice to which a fifth session belongs is a fourth slice. The terminal device may count the traffic of the fourth session into the traffic of the third slice. In other words, the traffic of the third slice is equal to the traffic of the fourth session.

In the foregoing examples, the terminal device may sum up traffic of sessions belonging to a same slice, to obtain slice traffic of the slice.

The second group: Count type slice traffic based on a slice type of a slice to which a session belongs.

Using FIG. 1 as an example, the slice type of the slice to which the first session belongs is the eMBB slice type, a slice type of the slice to which the second session belongs is the eMBB slice type, a slice type of the slice to which the third session belongs is the eMBB slice type, and a slice type of a slice to which the sixth session belongs is the eMBB slice type. The terminal device may count the traffic of the first session, the traffic of the second session, the traffic of the third session, and traffic of the sixth session into traffic of an eMBB type slice. In other words, the traffic of the eMBB type slice is equal to a sum of the traffic of the first session, the traffic of the second session, the traffic of the third session, and the traffic of the sixth session.

Using FIG. 1 as an example, a slice type of the slice to which the fourth session belongs is a URLLC slice type. The terminal device may count the traffic of the fourth session into traffic of the URLLC slice type. In other words, the traffic of the URLLC slice type is equal to the traffic of the fourth session.

Using FIG. 1 as an example, a slice type of the slice to which the fifth session belongs is an mMTC slice type. The terminal device may count the traffic of the fifth session into traffic of the mMTC slice type. In other words, the traffic of the mMTC slice type is equal to the traffic of the fifth session.

In the foregoing examples, the terminal device may sum up traffic of sessions belonging to a same slice type, to obtain type slice traffic of the slice type.

The third group: Count DNN traffic based on a DNN to which a session belongs.

Using FIG. 1 as an example, the DNN to which the first session belongs is the first DNN, and a DNN to which the sixth session belongs is the first DNN. The terminal device may count the traffic of the first session and the traffic of the sixth session into traffic of the first DNN. In other words, the traffic of the first DNN is equal to a sum of the traffic of the first session and the traffic of the sixth session.

Using FIG. 1 as an example, a DNN to which the second session belongs is a second DNN, and a DNN to which the third session belongs is the second DNN. The terminal device may count the traffic of the second session and the traffic of the third session into traffic of the second DNN. In other words, the traffic of the second DNN is equal to a sum of the traffic of the second session and the traffic of the third session.

Using FIG. 1 as an example, a DNN to which the fourth session belongs is a third DNN, and a DNN to which the fifth session belongs is the third DNN. The terminal device may count the traffic of the fourth session and the traffic of the fifth session into traffic of the third DNN. In other words, the traffic of the third DNN is equal to a sum of the traffic of the fourth session and the traffic of the fifth session.

In the foregoing examples, the terminal device may sum up traffic of sessions belonging to a same DNN, to obtain DNN traffic of the DNN.

The fourth group: Count AN traffic based on an AN used by a session.

Using FIG. 1 as an example, the AN used by the first session is the NR, an AN used by the second session is the NR, an AN used by the third session is the NR, and an AN used by the fourth session is the NR. The terminal device may count the traffic of the first session, the traffic of the second session, the traffic of the third session, and the traffic of the fourth session into traffic of the NR. In other words, the traffic of the NR is equal to a sum of the traffic of the first session, the traffic of the second session, the traffic of the third session, and the traffic of the fourth session.

Using FIG. 1 as an example, an AN used by the fifth session is the eLTE. The terminal device may count the traffic of the fourth session into traffic of the eLTE. In other words, the traffic of the eLTE is equal to the traffic of the fifth session.

Using FIG. 1 as an example, an AN used by the sixth session is the non-3GPP. The terminal device may count the traffic of the sixth session into traffic of the non-3GPP. In other words, the traffic of the non-3GPP is equal to the traffic of the sixth session.

In the foregoing examples, the terminal device may sum up traffic of sessions belonging to a same AN, to obtain AN traffic of the AN.

It may be understood that the foregoing examples illustrate how to count traffic based on a slice, a slice type, a DNN, and an AN separately. However, in actual application, two or more of a slice, a slice type, a DNN, and an AN may alternatively be combined for traffic counting. For example, the terminal device may count traffic by combining a slice type and a DNN. This is not specifically limited herein.

Using a combination of a slice type and a DNN as an example, the terminal device may count traffic in the following manners.

Using FIG. 1 as an example, the slice type of the slice to which the first session belongs is the eMBB slice type, and the DNN to which the first session belongs is the first DNN; and the slice type of the slice to which the sixth session belongs is the eMBB slice type, and the DNN to which the sixth session belongs is the first DNN. The terminal device may count the traffic of the first session and the traffic of the sixth session into traffic that is of both the eMBB slice type and the first DNN. In other words, the traffic that is of both the eMBB slice type and the first DNN is equal to the sum of the traffic of the first session and the traffic of the sixth session.

Using FIG. 1 as an example, the slice type of the slice to which the second session belongs is the eMBB slice type, and the DNN to which the second session belongs is the second DNN; and the slice type of the slice to which the third session belongs is the eMBB slice type, and the DNN to which the third session belongs is the second DNN. The terminal device may count the traffic of the second session and the traffic of the third session into traffic that is of both the eMBB slice type and the second DNN. In other words, the traffic that is of both the eMBB slice type and the second DNN is equal to the sum of the traffic of the second session and the traffic of the third session.

Using FIG. 1 as an example, the slice type of the slice to which the fourth session belongs is the URLLC slice type, and the DNN to which the fourth session belongs is the third DNN. The terminal device may count the traffic of the fourth session into traffic that is of both the URLLC slice type and the third DNN. In other words, the traffic that is of both the URLLC slice type and the third DNN is equal to the traffic of the fourth session.

Using FIG. 1 as an example, the slice type of the slice to which the fifth session belongs is the mMTC slice type, and the DNN to which the fifth session belongs is a fourth DNN. The terminal device may count the traffic of the fifth session into traffic that is of both the mMTC slice type and the fourth DNN. In other words, the traffic that is of both the mMTC slice type and the fourth DNN is equal to the traffic of the fifth session.

In the foregoing examples, only the combination of a slice type and a DNN is used as an example for description. In actual application, the terminal may alternatively count traffic by combining other session information, and details are not described herein.

The terminal device may display counted slice traffic, counted type slice traffic, counted DNN traffic, and counted AN traffic on a display interface. Details are as follows:

(1) The terminal device may display one or more of the slice traffic, the type slice traffic, the DNN traffic, the AN traffic, and the like on a screensaver. For example, the terminal device may display the slice traffic, the type slice traffic, the DNN traffic, and the AN traffic in a list form on the screensaver. Alternatively, when a screen is turned on, the terminal device may display the slice traffic, the type slice traffic, the DNN traffic, and the AN traffic in turn on the screensaver. Alternatively, when the screen is turned on, the terminal device first sequentially displays the slice traffic, the type slice traffic, the DNN traffic, and the AN traffic on the screensaver, and then displays the slice traffic, the type slice traffic, the DNN traffic, and the AN traffic in a list form on the screensaver. It should be understood that the foregoing examples of displaying each type of counted traffic on the screensaver are merely used as examples, and should not constitute a specific limitation.

(2) The terminal device may display one or more of the slice traffic, the type slice traffic, the DNN traffic, the AN traffic, and the like on a status bar. For example, the terminal device may display the slice traffic, the type slice traffic, the DNN traffic, and the AN traffic in turn on the status bar. Alternatively, the terminal device may always display the slice traffic, the type slice traffic, the DNN traffic, and the AN traffic on the status bar. A touch point may be set on the status bar for the terminal device. When the touch point is touched by a finger or it senses that a finger is approaching, a floating display box pops up to display the slice traffic, the type slice traffic, the DNN traffic, and the AN traffic. It should be understood that the foregoing examples of displaying each type of counted traffic on the status bar are merely used as examples, and should not constitute a specific limitation.

(3) The terminal device may display one or more of the slice traffic, the type slice traffic, the DNN traffic, the AN traffic, and the like on a desktop. For example, the terminal device may display the slice traffic, the type slice traffic, the DNN traffic, and the AN traffic in a list form in a fixed area of the desktop. Alternatively, the terminal device may display the slice traffic, the type slice traffic, the DNN traffic, and the AN traffic in turn in a fixed area of the desktop. Alternatively, a hidden display box is set on an edge of the desktop for the terminal device, and after the hidden display box is triggered, the display box pops up to display the slice traffic, the type slice traffic, the DNN traffic, and the AN traffic. It should be understood that the foregoing examples of displaying each type of counted traffic on the desktop are merely used as examples, and should not constitute a specific limitation.

(4) The terminal device may display one or more of the slice traffic, the type slice traffic, the DNN traffic, the AN traffic, and the like on a traffic management interface. For example, after "Settings"→"Traffic Management" is touched on the terminal device, a traffic management interface may pop up, and the slice traffic, the type slice traffic, the DNN traffic, and the AN traffic are displayed on the traffic management interface. Alternatively, after "Settings"→"Traffic Management" is touched on the terminal device, a traffic management interface may pop up, and the type slice traffic, the DNN traffic, and the AN traffic are displayed on the traffic management interface. When the type slice traffic of a slice type is selected, traffic of each slice of the slice type is displayed in detail. When the DNN traffic is selected, traffic of each DNN is displayed in detail. When the AN traffic is selected, traffic of each AN is displayed in detail. It should be understood that the foregoing examples of displaying each type of counted traffic on the desktop are merely used as examples, and should not constitute a specific limitation.

It may be understood that, in addition to displaying the counted slice traffic, the counted type slice traffic, the counted DNN traffic, and the counted AN traffic on the screensaver, the status bar, the desktop, and the traffic management interface, the terminal device may also display the counted slice traffic, the counted type slice traffic, the counted DNN traffic, and the counted AN traffic in another part, for example, a drop-down menu bar. This is not specifically limited herein.

In some embodiments, the terminal device may count currently used slice traffic, currently used type slice traffic, currently used DNN traffic, and currently used AN traffic in real time. Alternatively, the terminal device may daily count slice traffic used in a single day, type slice traffic used in a single day, DNN traffic used in a single day, and AN traffic used in a single day. Alternatively, the terminal device may weekly count slice traffic used in a single week, type slice traffic used in a single week, DNN traffic used in a single week, and AN traffic used in a single week. Alternatively, the terminal device may monthly count slice traffic used in a single month, type slice traffic used in a single month, DNN traffic used in a single month, and AN traffic used in a single month. The foregoing examples of time units for traffic counting are merely used as examples, and should not constitute a specific limitation.

In some embodiments, the terminal device may display, in chart display manners such as a table, a line chart, a bar chart, a histogram, a pie chart, and a scatter chart, traffic counting results that include currently used slice traffic, currently used type slice traffic, currently used DNN traffic, currently used AN traffic, slice traffic used in a single day, type slice traffic used in a single day, DNN traffic used in a single day, AN traffic used in a single day, slice traffic used in a single week, type slice traffic used in a single week, DNN traffic used in a single week, AN traffic used in a single week, slice traffic used in a single month, type slice traffic used in a single month, DNN traffic used in a single month, and AN traffic used in a single month. It should be understood that the foregoing chart display manners are merely used as examples, and should not constitute a specific limitation.

It may be understood that the foregoing is merely a specific embodiment in which the terminal device displays, on the display interface, the counted slice traffic, the counted type slice traffic, the counted DNN traffic, the counted AN traffic, and the like. In actual application, the terminal device may display, on the display interface, one or more of the counted slice traffic, the counted type slice traffic, the counted DNN traffic, and the counted AN traffic. This is not specifically limited herein.

It may be understood that the foregoing traffic display manners of displaying the counted slice traffic, the counted type slice traffic, the counted DNN traffic, and the counted AN traffic on the display interface may be set by default before delivery, or may be set by a user. For example, the user may select one traffic display manner from a traffic display menu that includes a plurality of traffic display manners, or the user may customize a traffic display manner according to the user's own usage habits.

With reference to specific examples, the following describes that the terminal device may display the counted slice traffic, the counted type slice traffic, the counted DNN traffic, and the counted AN traffic on a display interface.

Figure 2A:
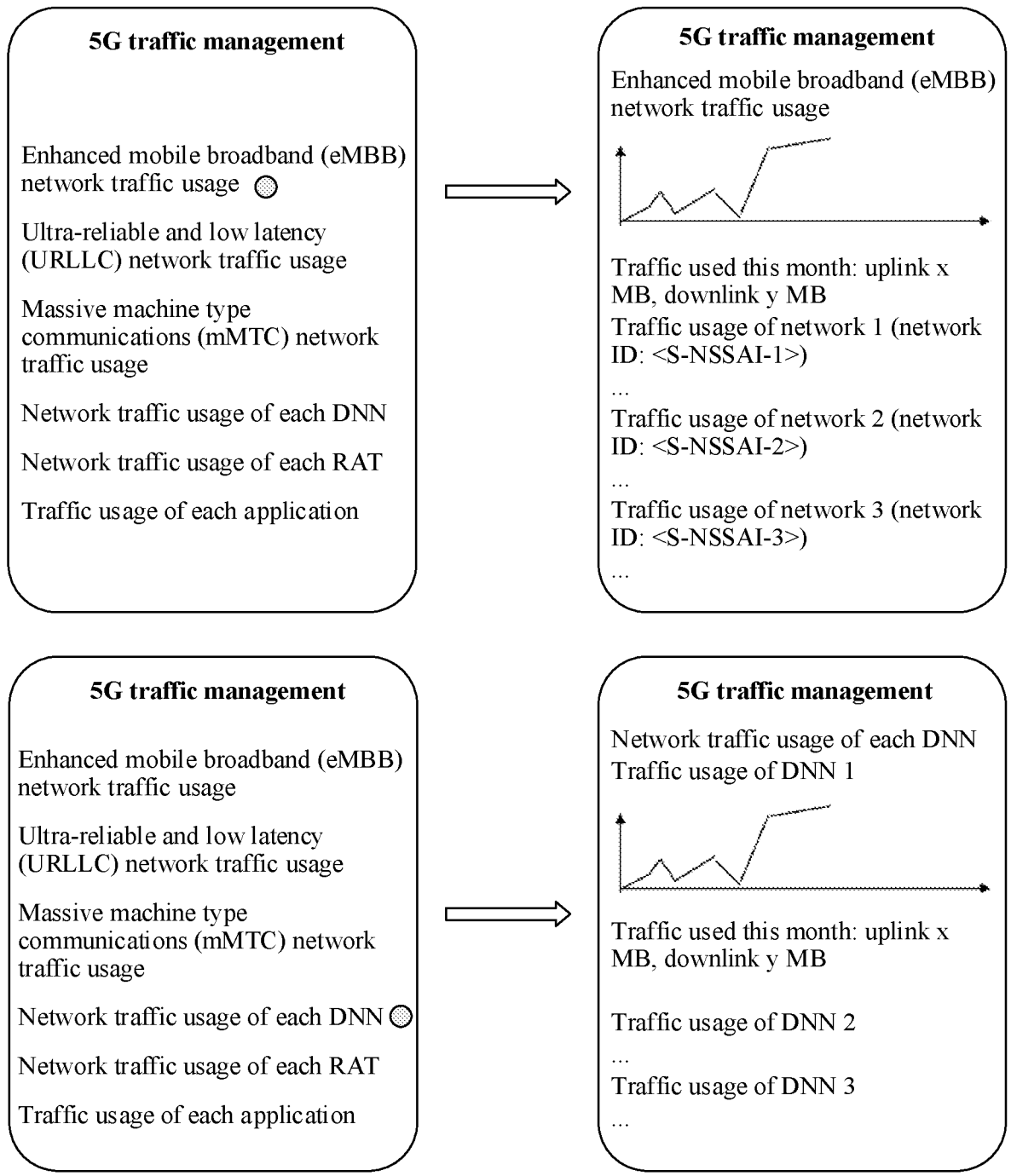

As shown in FIG. 2A and FIG. 2B, a display interface in the upper left part of the figure displays a list related to 5G traffic management, including eMBB network traffic usage, URLLC network traffic usage, mMTC network traffic usage, network traffic usage of each DNN, network traffic usage of each RAT, and traffic usage of each application. A display interface in the upper right part of the figure displays the eMBB network traffic usage. Specifically, daily traffic usage of an eMBB network is displayed in a line chart, and traffic usage of each slice is displayed in a list form. When the eMBB network traffic usage shown in the upper left part of FIG. 2A and FIG. 2B is touched, the eMBB network traffic usage shown in the upper right part of FIG. 2A and FIG. 2B is displayed.

As shown in FIG. 2A and FIG. 2B, a display interface in the middle left part of the figure displays the list related to 5G traffic management, including the eMBB network traffic usage, the URLLC network traffic usage, the mMTC network traffic usage, the network traffic usage of each DNN, the network traffic usage of each RAT, and the traffic usage of each application. A display interface in the middle right part of the figure displays the DNN network traffic usage. Specifically, daily traffic usage of a DNN network is displayed in a line chart, and network traffic usage of each DNN is displayed in a list form. When the network traffic usage of each DNN shown in the middle left part of FIG. 2A and FIG.

2B is touched, the network traffic usage of each DNN shown in the middle right part of FIG. 2A and FIG. 2B is displayed.

As shown in FIG. 2A and FIG. 2B, a display interface in the lower left part of the figure displays the list related to 5G traffic management, including the eMBB network traffic usage, the URLLC network traffic usage, the mMTC network traffic usage, the network traffic usage of each DNN, the network traffic usage of each RAT, and the traffic usage of each application. A display interface in the lower right part of the figure displays the traffic usage of each application. Specifically, daily traffic usage of each application is displayed in a line chart, and traffic usage details of each application are displayed in a list form. When the traffic usage of each application shown in the lower left part of FIG. 2A and FIG. 2B is touched, the traffic usage of each application shown in the lower right part of FIG. 2A and FIG. 2B is displayed.

It may be understood that the traffic display manners shown in FIG. 2A and FIG. 2B are merely used as examples, and should not constitute a specific limitation.

Figure 3A:
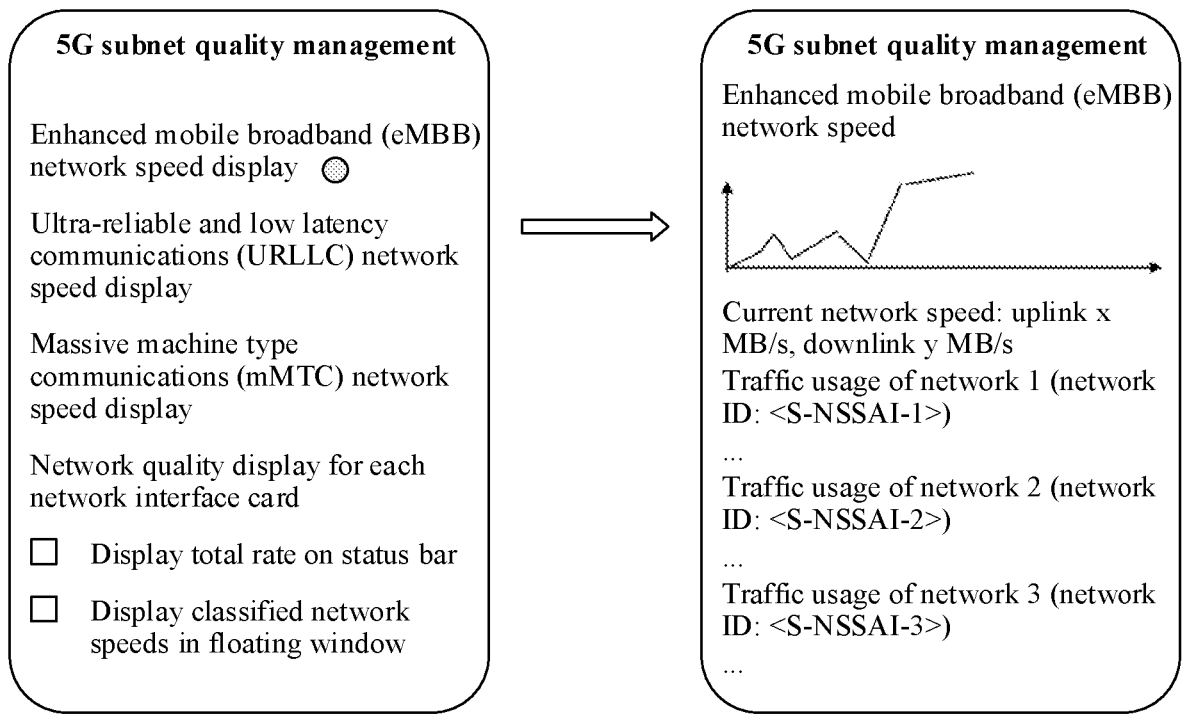

It may be understood that a counting manner, a display manner (for example, manners shown in FIG. 3A and FIG. 3B), and the like that are of a rate are similar to a counting manner, the display manner, and the like that are of traffic, and they are not described in detail herein.

The terminal device may stop using the slice traffic, the type slice traffic, the DNN traffic, and the AN traffic. Details are as follows:

(1) When the slice traffic is greater than or equal to or close to an upper slice traffic limit, the terminal device stops using the slice traffic. For example, when the traffic of the first slice is greater than or equal to or close to the upper slice traffic limit, the terminal device stops using the traffic of the first slice. For a plurality of slices, their upper slice traffic limits may be completely the same or partially the same, or may be completely different. This is not specifically limited herein.

(2) When the type slice traffic is greater than or equal to or close to an upper slice type traffic limit, the terminal device stops using the type slice traffic. For example, when traffic of a first type slice is greater than or equal to or close to the upper slice type traffic limit, the terminal device stops using the traffic of the first type slice. For a plurality of slice types, their upper slice type traffic limits may be completely the same or partially the same, or may be completely different. This is not specifically limited herein.

(3) When the DNN traffic is greater than or equal to or close to an upper DNN traffic limit, the terminal device stops using the DNN traffic. For example, when the traffic of the first DNN is greater than or equal to or close to the upper DNN traffic limit, the terminal device stops using the traffic of the first DNN. For a plurality of DNNs, their upper DNN traffic limits may be completely the same or partially the same, or may be completely different. This is not specifically limited herein.

(4) When the AN traffic is greater than or equal to or close to an upper AN traffic limit, the terminal device stops using the AN traffic. For example, when traffic of a first AN is greater than or equal to or close to the upper AN traffic limit, the terminal device stops using the traffic of the first AN. For a plurality of ANs, their upper AN traffic limits may be completely the same or partially the same, or may be completely different. This is not specifically limited herein.

In some embodiments, after stopping using the slice traffic, the terminal device may further choose to resume using the slice traffic. It may be that the terminal device automatically resumes using the slice traffic after obtaining the slice traffic again, or may be that a user forcibly resumes using the slice traffic. In addition, the same applies to the type slice traffic, the DNN traffic, and the AN traffic.

In some embodiments, the terminal device may automatically stop using the slice traffic when the slice traffic is greater than or equal to or close to the upper slice traffic limit. Alternatively, when the slice traffic is greater than or equal to or close to the upper slice traffic limit, the terminal device may prompt a user whether to stop using the slice traffic, and stop using the slice traffic after receiving a confirmation instruction from the user. In addition, the same applies to the type slice traffic, the DNN traffic, and the AN traffic.

The terminal device may alternatively stop using the slice traffic, the type slice traffic, the DNN traffic, and the AN traffic in the following manners. Details are as follows:

(1) When the slice traffic is less than or not close to the upper slice traffic limit, the terminal device displays the slice traffic on a display interface. When a user needs to stop using the slice traffic, the user may select or deselect the slice traffic on the display interface. Then, the terminal device stops using the selected or deselected slice traffic. For example, the terminal device displays the traffic of the first slice on a display interface. When the user needs to stop using the traffic of the first slice, the user may select or deselect the traffic of the first slice on the display interface. If the user needs to stop using a plurality of pieces of slice traffic at a time, the user may select or deselect the corresponding plurality of pieces of slice traffic on the display interface at a time.

(2) When the type slice traffic is less than or not close to the upper slice type traffic limit, the terminal device displays the type slice traffic on a display interface. When a user needs to stop using the type slice traffic, the user may select or deselect a corresponding type slice type on the display interface. For example, the terminal device displays the traffic of the eMBB type slice on a display interface. When the user needs to stop using the traffic of the eMBB type slice, the user may select or deselect the traffic of the eMBB type slice on the display interface. If the user needs to stop using a plurality of pieces of type slice traffic at a time, the user may select or deselect the corresponding plurality of pieces of type slice traffic on the display interface at a time.

(3) When the DNN traffic is less than or not close to the upper DNN traffic limit, the terminal device displays the DNN traffic on a display interface. When a user needs to stop using the DNN traffic, the user may select or deselect the corresponding DNN traffic on the display interface. Then, the terminal device stops using the selected or deselected DNN traffic. For example, the terminal device displays the traffic of the first DNN on a display interface. When the user needs to stop using the traffic of the first DNN, the user may select or deselect the traffic of the first DNN on the display interface. If the user needs to stop using a plurality of pieces of DNN traffic at a time, the user may select or deselect the corresponding plurality of pieces of DNN traffic on the display interface at a time.

(4) When the AN traffic is less than or not close to the upper AN traffic limit, the terminal device displays the AN traffic on a display interface. When a user needs to stop using the AN traffic, the user may select or deselect the corresponding AN traffic on the display interface. Then, the terminal device stops using the selected or deselected AN traffic. For example, the terminal device displays the traffic of the NR on a display interface. When the user needs to stop using the traffic of the NR, the user may select or deselect the traffic of the NR on the display interface. If the user needs to stop using a plurality of pieces of AN traffic at a time, the user may select or deselect the corresponding plurality of pieces of AN traffic on the display interface at a time.

It may be understood that the foregoing manners in which the terminal device stops using the slice traffic, the type slice traffic, the DNN traffic, the AN traffic, and the like are merely examples, and should not constitute a specific limitation. In actual application, the terminal device may stop using one or more of the slice traffic, the type slice traffic, the DNN traffic, and the AN traffic. This is not specifically limited herein.

An application may be various software that is provided by an application provider and that is downloaded and installed on a terminal device, or may be various software that is developed by a terminal device manufacturer and is preinstalled on a terminal device before delivery of the terminal device. There are a wide variety of applications that may include an instant messaging application, a game application, a video application, a reading application, a health management application, a travel application, a music application, a financial application, a map application, a taxi-hailing application, an express delivery application, and the like. By using various applications, the terminal device may provide various corresponding services for users, for example, a communication service, a video viewing service, a reading service, a health management service, a travel consulting service, a music appreciation service, a payment and transfer service, a navigation service, a taxi-hailing service, and an express query service.

The following separately describes relationships between an application and a session, a network interface (network interface), a slice, a slice type, a DNN, and an AN. The following relationships exist between an application and a session, a slice, a slice type, a DNN, and an AN separately: Each session supports at least one application; each slice supports at least one application; each slice type supports at least one application; each DNN supports at least one application; and each AN supports at least one application. Each session herein corresponds to one network interface.

Figure 4:
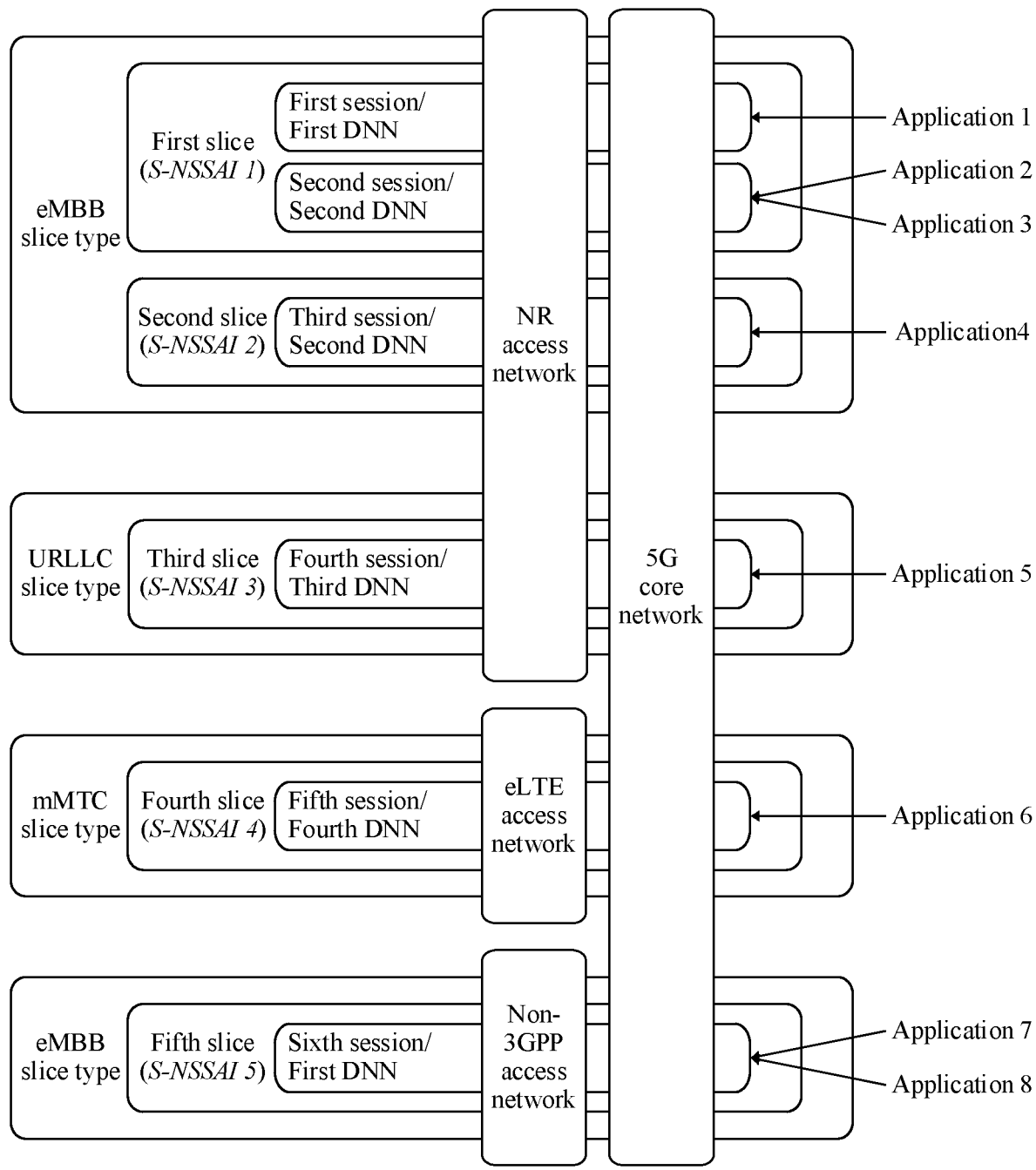
FIG. 4 is a diagram of relationships between an application and a session, a slice, a slice type, a DNN, and an AN in this application.

A same session supports a plurality of applications. The relationship between an application and a session may be shown on the right side of FIG. 4, where an application is shown on the right side of an arrow, and a session is shown in a horizontal block at an inner layer on the left side of the arrow. As shown in FIG. 4, the arrow points to the horizontal block at the inner layer on the left side from the application shown on the right side, indicating that a slice represented by the horizontal block at the inner layer on the left side supports the application shown on the right side. The second session in FIG. 2A and FIG. 2B is used as an example. Arrows for both an application 2 and an application 3 point to the second session, which indicates that the second session supports both the application 2 and the application 3.

A same network interface supports a plurality of applications. The relationship between a network interface and an application is completely equivalent to the relationship between a session and an application. Details are not described herein again.

A same slice supports a plurality of applications. The relationship between an application and a slice may be shown on the right side of FIG. 4, where each slice includes a plurality of sessions, and therefore applications supported by the sessions are also supported by a corresponding slice. A first slice in FIG. 4 is used as an example. The first slice includes a first session and the second session. Therefore, the first slice supports an application 1, the application 2, and the application 3.

A same slice type supports a plurality of applications. The relationship between an application and a slice type may be shown on the right side of FIG. 4, where each slice type includes a plurality of slices, each slice includes a plurality of sessions, and therefore applications supported by the sessions are also supported by a corresponding slice type. An eMBB slice type in FIG. 4 is used as an example. The eMBB slice type includes the first slice, a second slice, and a fifth slice. The first slice includes the first session and the second session. The second slice includes a third session. The fifth slice includes a sixth session. The first slice supports the application 1, the application 2, and the application 3. The second slice supports an application 4. The fifth slice supports an application 7 and an application 8. Therefore, the eMBB slice type supports the application 1, the application 2, the application 3, the application 4, the application 7, and the application 8.

A same DNN supports a plurality of applications. The relationship between an application and a DNN may be shown on the right side of FIG. 4, where each DNN includes a plurality of sessions, and therefore applications supported by the sessions are also supported by a corresponding DNN. A first DNN in FIG. 4 is used as an example. The first DNN includes the first session and the sixth session. Therefore, the first DNN supports the application 1, the application 7, and the application 8.

A same AN supports a plurality of applications. The relationship between an application and an AN may be shown on the right side of FIG. 4, where each AN includes a plurality of sessions, and therefore applications supported by the sessions are also supported by a corresponding AN. NR in FIG. 4 is used as an example. The NR type includes the first session, the second session, the third session, and a fourth session. Therefore, the NR supports the application 1, the application 2, the application 3, the application 4, and an application 5.

It should be understood that FIG. 4 is merely used as an example of the relationships between an application and a session, a slice, a slice type, a DNN, and an AN. In another embodiment, the relationships between an application and a session, a slice, a slice type, a DNN, and an AN may alternatively be implemented in another form. This is not specifically limited herein.

The terminal device may display, on a display interface, an application supported by a session, an application supported by a slice, an application supported by a slice type, an application supported by a DNN, and an application supported by an AN. Some embodiments in the following describe in detail how the terminal device displays, on a display interface, an application supported by a session, an application supported by a slice, an application supported by a slice type, an application supported by a DNN, and an application supported by an AN.

Figure 5A:
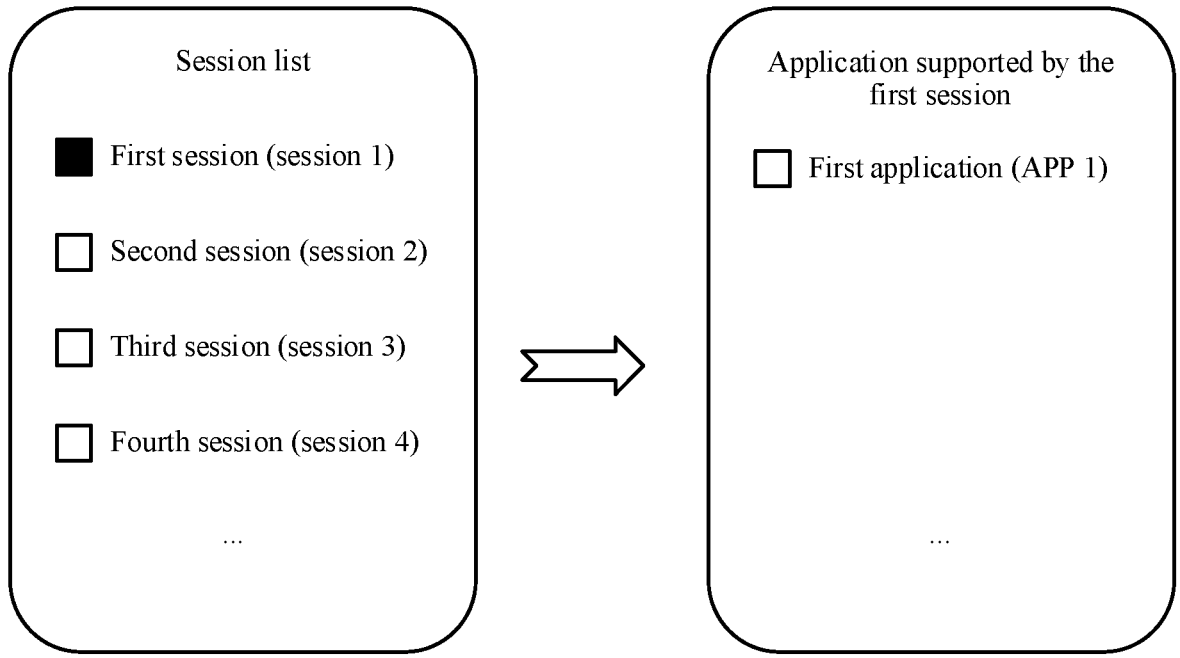
FIG. 5A to FIG. 5E are schematic diagrams of applications supported by a session, a slice, a slice type, a DNN, and an AN according to this application.

As shown in FIG. 5A, a left-side display interface in the figure displays one or more sessions including the first session, and a right-side display interface in the figure displays one or more applications supported by the first session. The terminal device first displays an interface, and the displayed interface is shown as the left-side display interface in FIG. 5A. When the first session on the interface is touched, the terminal device displays another interface to display an application supported by the first session, where the another interface is shown as the right-side display interface in FIG. 5A.

Figure 5B:
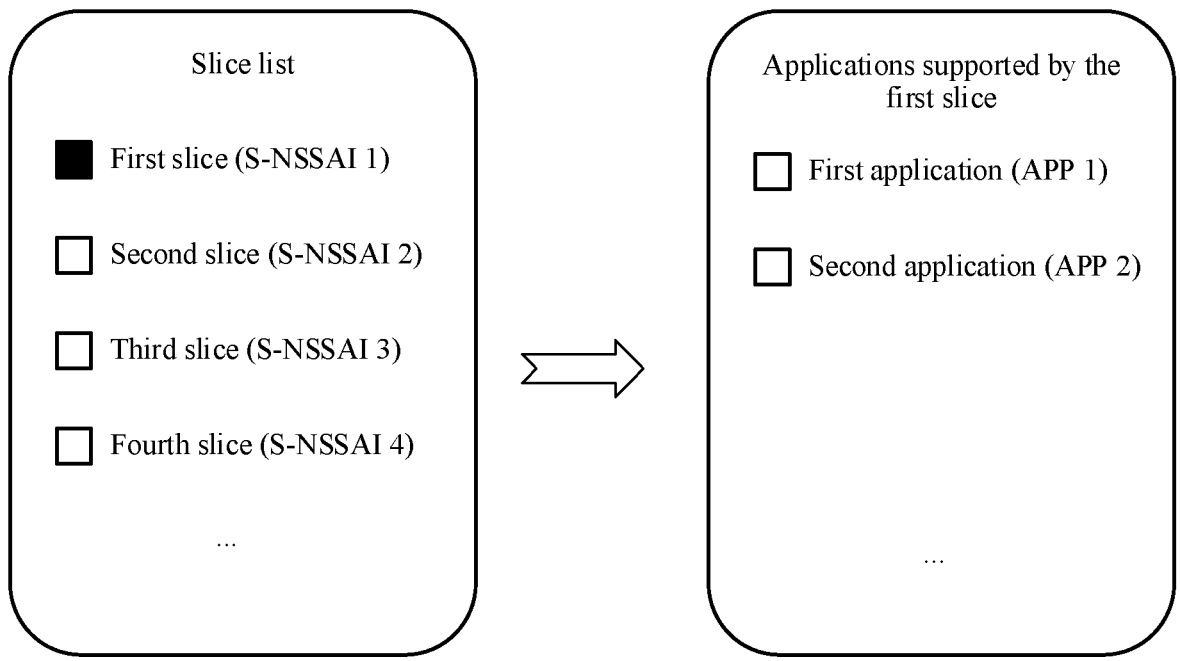

As shown in FIG. 5B, a left-side display interface in the figure displays one or more slices including the first slice, and a right-side display interface in the figure displays one or more applications supported by the first slice. The terminal device first displays an interface, and the displayed interface is shown as the left-side display interface in FIG. 5B. When the first slice on the interface is touched, the terminal device displays another interface to display an application supported by the first slice, where the another interface is shown as the right-side display interface in FIG. 5B.

Figure 5C:
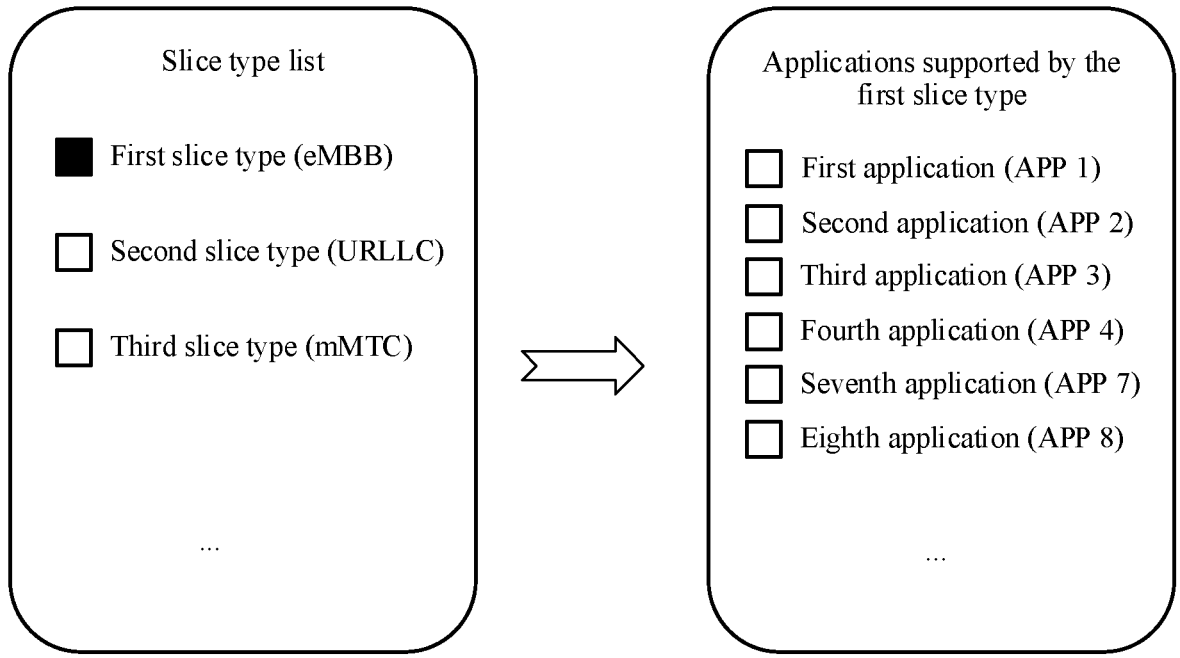

As shown in FIG. 5C, a left-side display interface in the figure displays one or more slice types including a first slice type, and a right-side display interface in the figure displays one or more applications supported by the first slice type. The terminal device first displays an interface, and the displayed interface is shown as the left-side display interface in FIG. 5C. When the first slice type on the interface is touched, the terminal device displays another interface to display an application supported by the first slice type, where the another interface is shown as the right-side display interface in FIG. 5B.

Figure 5D:
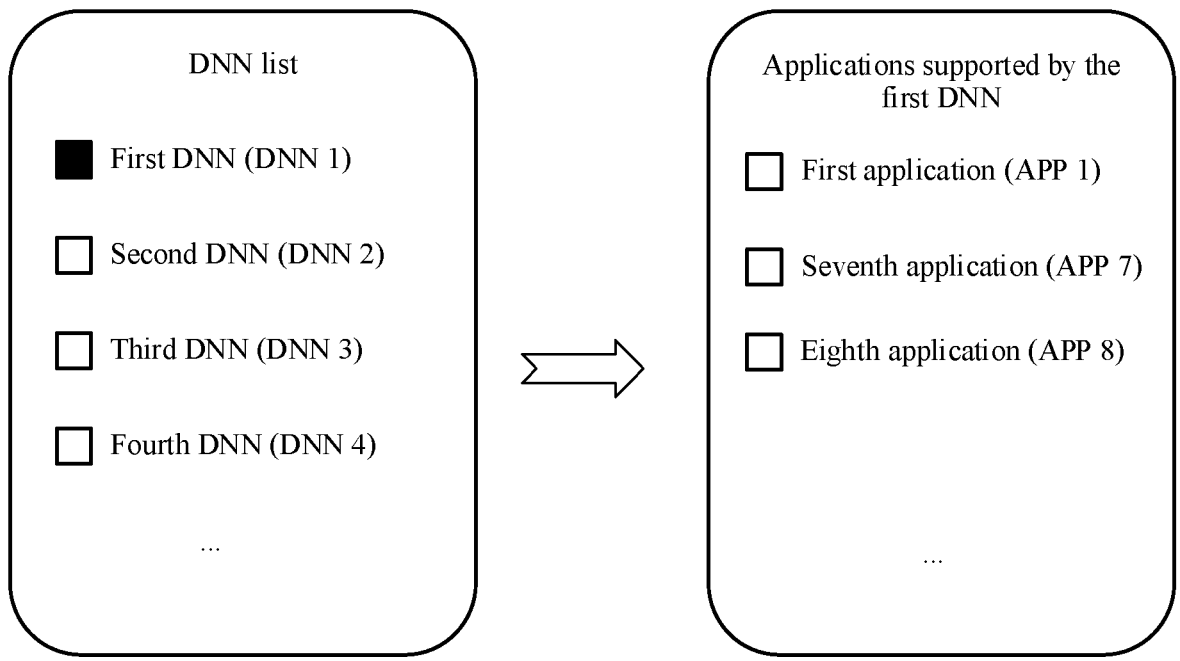

As shown in FIG. 5D, a left-side display interface in the figure displays one or more DNNs including the first DNN, and a right-side display interface in the figure displays one or more applications supported by the first DNN. The terminal device first displays an interface, and the displayed interface is shown as the left-side display interface in FIG. 5D. When the first DNN on the interface is touched, the terminal device displays another interface to display an application supported by the first DNN, where the another interface is shown as the right-side display interface in FIG. 5D.

Figure 5E:
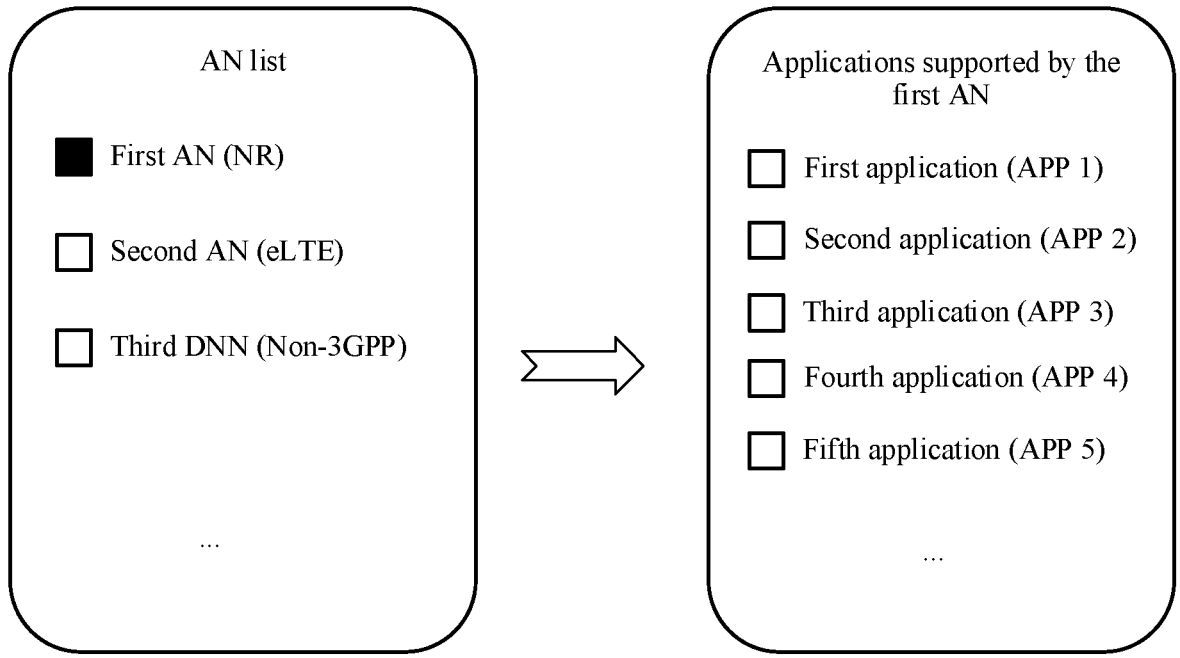

As shown in FIG. 5E, a left-side display interface in the figure displays one or more ANs including a first AN, and a right-side display interface in the figure displays one or more applications supported by the first AN. The terminal device first displays an interface, and the displayed interface is shown as the left-side display interface in FIG. 5E. When the first AN on the interface is touched, the terminal device displays another interface to display an application supported by the first AN, where the another interface is shown as the right-side display interface in FIG. 5E.

Herein, an application supported by a session is similar to an application supported by a network interface. For details, refer to FIG. 5A and related descriptions. Details are not described herein again.

It may be understood that FIG. 5A to FIG. 5E are merely used as examples of a display manner of an application supported by a session, an application supported by a slice, an application supported by a slice type, an application supported by a DNN, and an application supported by an AN. In another embodiment, the display manner of an application supported by a session, an application supported by a slice, an application supported by a slice type, an application supported by a DNN, and an application supported by an AN may alternatively use another implementation form. This is not specifically limited herein.

Based on the foregoing display manner, the terminal device may perform deselection management on an application. Some embodiments in the following describe in detail how the terminal device performs deselection management on an application.

As shown on the right side of FIG. 5A, an application supported by the first session is displayed on the display interface in the figure, and a check box is set in front of each application. When the check boxes in front of some or all of applications supported by the first session are selected by a user, the terminal device receives a first instruction entered by the user, and deselects, according to the first instruction, the some or all of the applications supported by the first session.

As shown on the right side of FIG. 5B, an application supported by a slice to which the first session belongs is displayed on the display interface in the figure, and a check box is set in front of each application. When the check boxes in front of some or all of applications supported by the slice to which the first session belongs are selected by a user, the terminal device receives a second instruction entered by the user, and deselects, according to the second instruction, the some or all of the applications supported by the slice to which the first session belongs.

As shown in FIG. 5C, an application supported by a slice to which the first session belongs is displayed on the display interface in the figure, and a check box is set in front of each application. When the check boxes in front of some or all of applications supported by the slice type to which the first session belongs are selected by a user, the terminal device receives a third instruction entered by the user, and deselects, according to the third instruction, the some or all of the applications supported by the slice type to which the first session belongs.

As shown on the right side of FIG. 5D, an application supported by a DNN to which the first session belongs is displayed on the display interface in the figure, and a check box is set in front of each application. When the check boxes in front of some or all of applications supported by the DNN to which the first session belongs are selected by a user, the terminal device receives a fourth instruction entered by the user, and deselects, according to the fourth instruction, the some or all of the applications supported by the DNN to which the first session belongs.

As shown on the right side of FIG. 5E, an application supported by an AN to which the first session belongs is displayed on the display interface in the figure, and a check box is set in front of each application. When the check boxes in front of some or all of applications supported by the AN to which the first session belongs are selected by a user, the terminal device receives a fifth instruction entered by the user, and deselects, according to the fifth instruction, the some or all of the applications supported by the AN to which the first session belongs.

Herein, deselection of an application supported by a session is similar to deselection of an application supported by a network interface. For details, refer to FIG. 3A and related descriptions. Details are not described herein again.

In the foregoing examples, deselecting an application may be understood as removing the application from a session, or a slice, or a slice type, or a DNN, or an AN to which the application belongs. In some implementations, the deselection may be releasing a binding relationship between the application and the session, or the slice, or the slice type, or the DNN, or the AN to which the application belongs, and a data packet for the application may be forwarded to another network interface.

It may be understood that the terminal device may display, on a display interface, one or more of an application supported by a session, an application supported by a slice, an application supported by a slice type, an application supported by a DNN, and an application supported by an AN. This is not specifically limited herein.

The terminal device may further display, on a display interface, a network quality requirement of an application, a network quality indicator of a session (equivalent to a network quality indicator of a network interface), a network quality indicator of a slice, a network quality indicator of a DNN, and the like. The network quality requirement may include one or more of a priority requirement, a packet latency requirement, a packet error rate requirement, an aggregate maximum bit rate (AMBR) requirement, a guaranteed flow bit rate (GFBR) requirement, a maximum flow bit rate (MFBR) requirement, and a maximum packet loss rate requirement. The network quality indicator may include one or more of a priority, a packet latency, a packet error rate, an AMBR, a GFBR, a MFBR, and a maximum packet loss rate.

Some embodiments in the following describe in detail how the terminal device displays, on a display interface, a network quality indicator of a session, a network quality indicator of a slice, a network quality indicator of a slice type, a network quality indicator of a DNN, a network quality indicator of an AN, and the like.

Figure 6A:
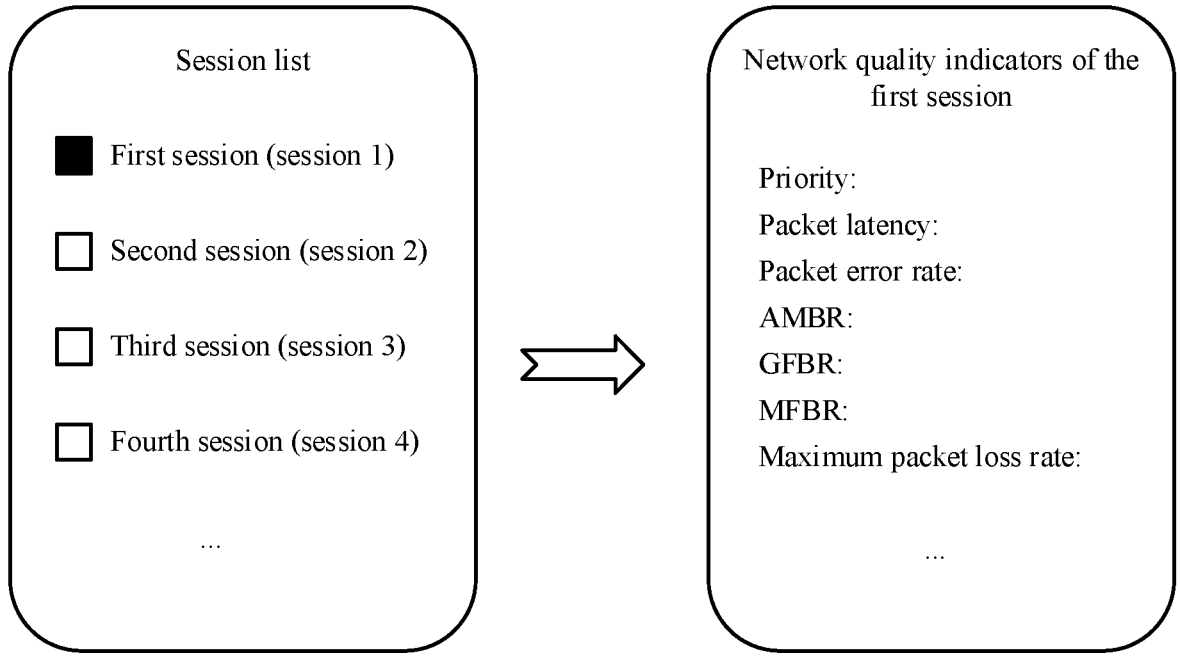
FIG. 6A to FIG. 6E are schematic diagrams of network quality indicators of a session, a slice, a slice type, a DNN, and an AN according to this application.

As shown in FIG. 6A, a left-side display interface in the figure displays a plurality of sessions including the first session, and a right-side display interface in the figure displays network quality indicators of the first session. The terminal device first displays an interface, and the displayed interface is shown as the left-side display interface in FIG. 6A. When the first session on the interface is touched, the terminal device displays another interface to display the network quality indicators of the first session, where the another interface is shown as the right-side display interface in FIG. 6A.

Figure 6B:
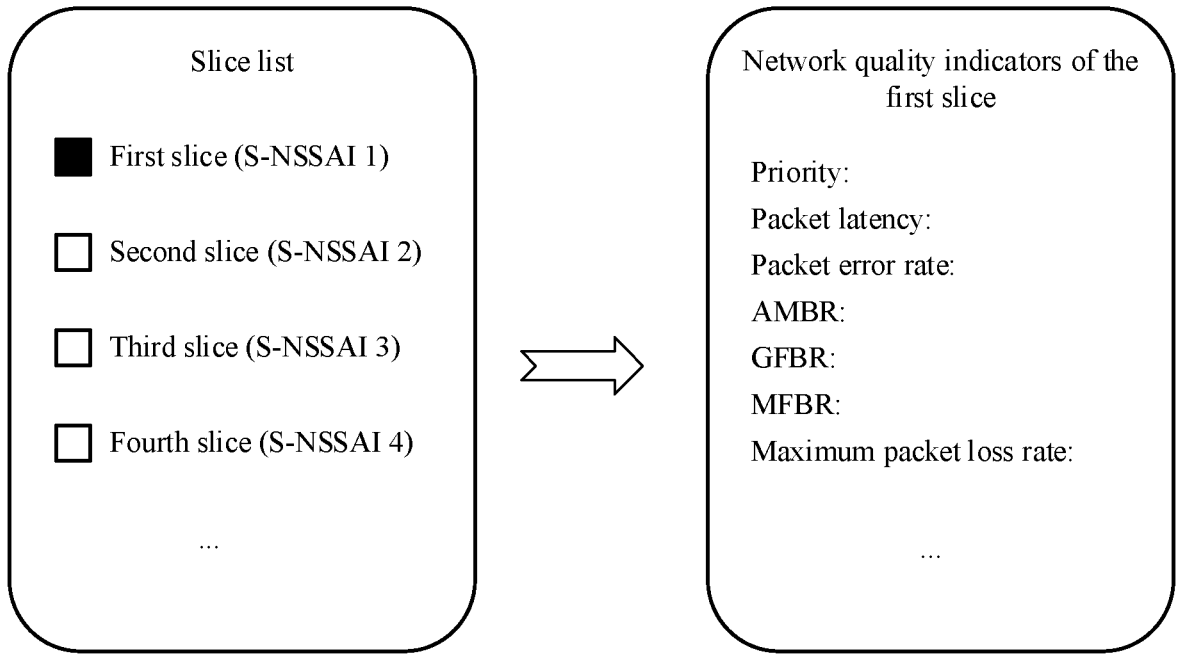

As shown in FIG. 6B, a left-side display interface in the figure displays a plurality of slices including the first slice, and a right-side display interface in the figure displays network quality indicators of the first slice. The terminal device first displays an interface, and the displayed interface is shown as the left-side display interface in FIG. 6B. When the first slice on the interface is touched, the terminal device displays another interface to display the network quality indicators of the first slice, where the another interface is shown as the right-side display interface in FIG. 6B.

Figure 6C:
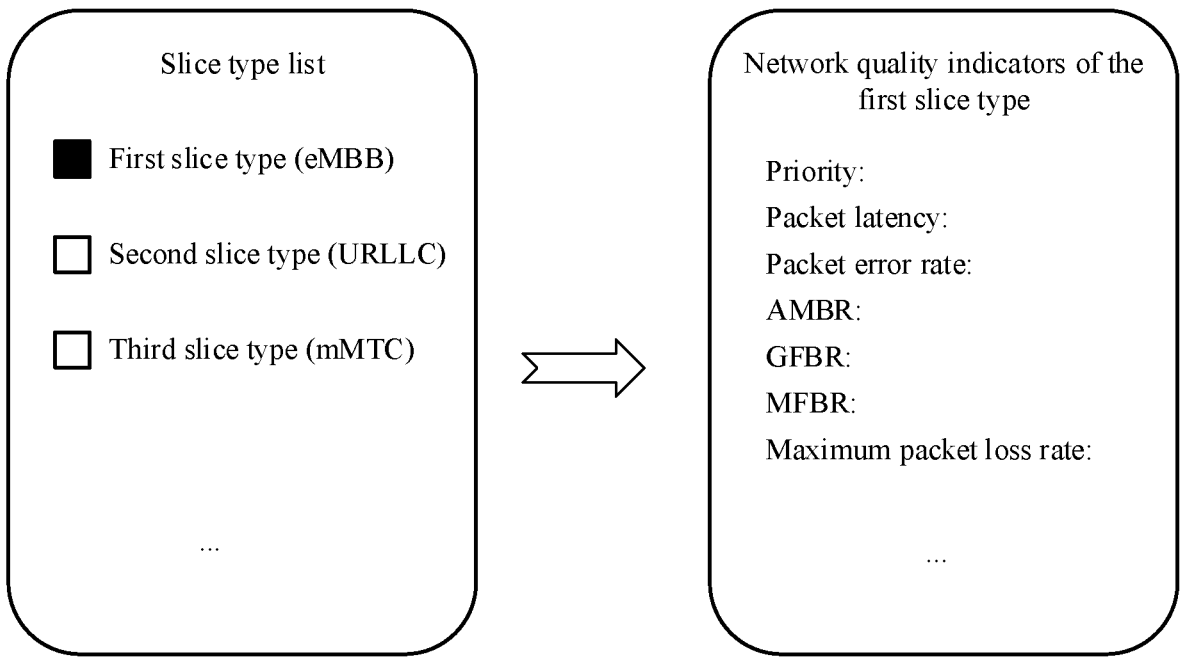

As shown in FIG. 6C, a left-side display interface in the figure displays a plurality of slice types including the first slice type, and a right-side display interface in the figure displays network quality indicators of the first slice type. The terminal device first displays an interface, and the displayed interface is shown as the left-side display interface in FIG. 6C. When the first slice type on the interface is touched, the terminal device displays another interface to display the network quality indicators of the first slice type, where the another interface is shown as the right-side display interface in FIG. 6C.

Figure 6D:
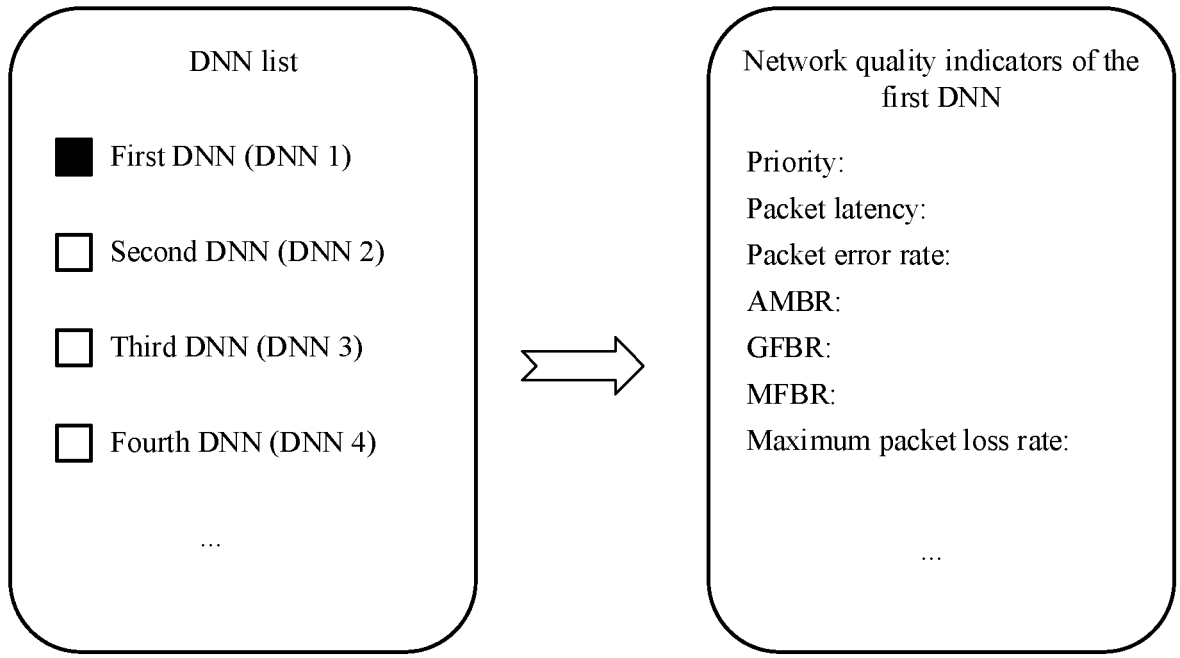

As shown in FIG. 6D, a left-side display interface in the figure displays a plurality of DNNs including the first DNN, and a right-side display interface in the figure displays network quality indicators of the first DNN. The terminal device first displays an interface, and the displayed interface is shown as the left-side display interface in FIG. 6D. When the first DNN on the interface is touched, the terminal device displays another interface to display the network quality indicators of the first DNN, where the another interface is shown as the right-side display interface in FIG. 6D.

Figure 6E:
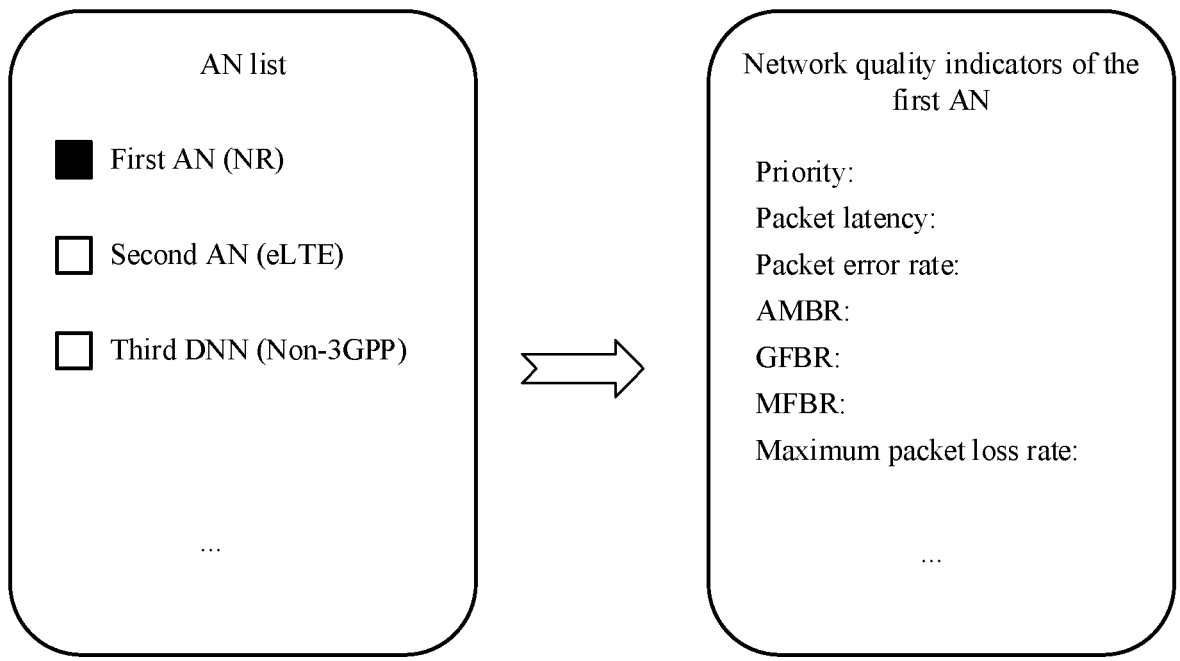

As shown in FIG. 6E, a left-side display interface in the figure displays a plurality of ANs including the first AN, and a right-side display interface in the figure displays network quality indicators of the first AN. The terminal device first displays an interface, and the displayed interface is shown as the left-side display interface in FIG. 6E. When the first AN on the interface is touched, the terminal device displays another interface to display the network quality indicators of the first AN, where the another interface is shown as the right-side display interface in FIG. 6E.

It may be understood that the terminal device may display, on a display interface, one or more of a network quality indicator of a session, a network quality indicator of a slice, a network quality indicator of a slice type, a network quality indicator of a DNN, and a network quality indicator of an AN. This is not specifically limited herein.

It may be understood that the terminal device may display both an application supported by a session and a network quality indicator of the session. For example, when the first session on the left side of FIG. 6A is touched, the terminal device may display both the application supported by the first session, as shown on the right side of FIG. 6A, and the network quality indicators of the first session, as shown on the right side of FIG. 6A. Correspondingly, the same applies to a slice, a slice type, a DNN, and an AN.

The terminal device may perform management of binding between an application and a network interface, between an application and a session, between an application and a slice, between an application and a slice type, between an application and a DNN, and between an application and an AN. The following describes, by using some embodiments, how a dual-screen terminal device performs management of binding between an application and a network interface, between an application and a session, between an application and a slice, between an application and a slice type, between an application and a DNN, and between an application and an AN.

Figure 7A:
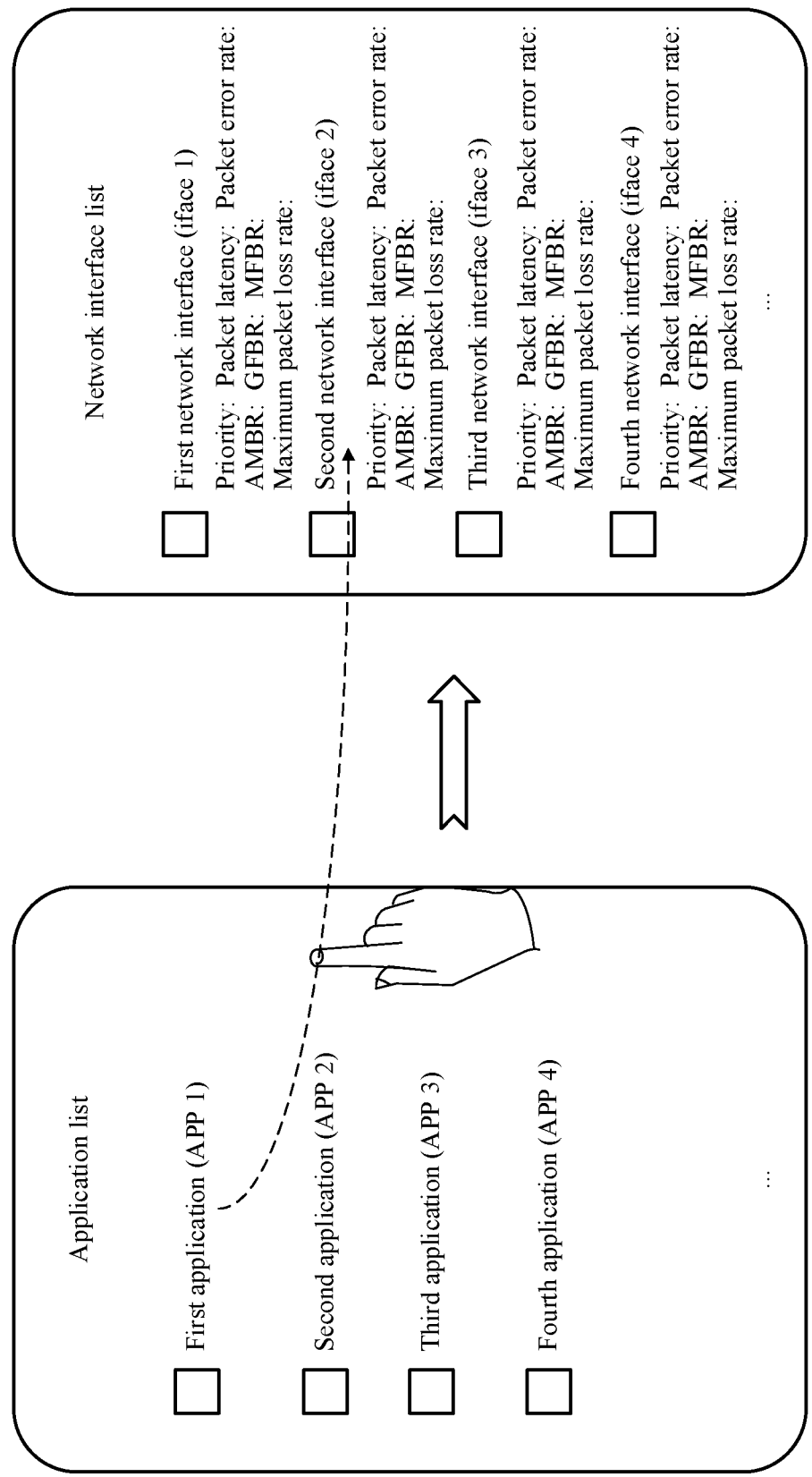
FIG. 7A to FIG. 7J are schematic diagrams of management of binding between an application and a network interface, a slice, a slice type, a DNN, and an AN on a dual-screen terminal device according to this application.

As shown in FIG. 7A, on the left side of FIG. 7A is an interface displayed on a first display screen, and the display interface on the first display screen displays a plurality of applications including a first application; and on the right side of FIG. 7A is an interface displayed on a second display screen, and the display interface on the second display screen displays a network quality indicator of one or more candidate network interfaces related to the first application. A user selects a target network interface (that is, a second network interface) from the candidate network interfaces based on the network quality indicators of the candidate network interfaces. When the user drags the first application from the left side to the target network interface on the right side, the first application is bound to the target network interface. It may be understood that there may be one or more target network interfaces. This is not specifically limited herein.

Figure 7B:
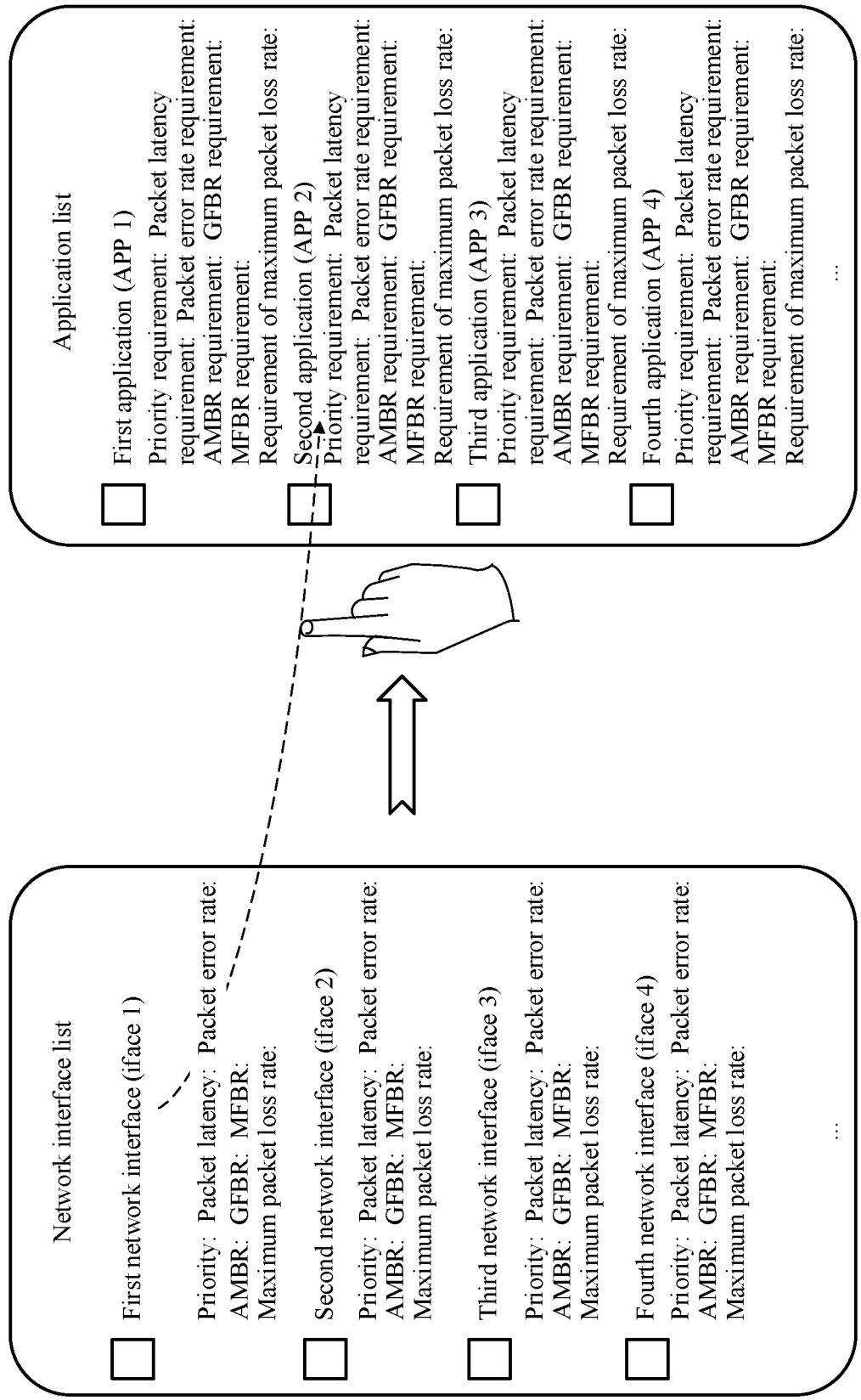

As shown in FIG. 7B, on the left side of FIG. 7B is an interface displayed on the first display screen, and the display interface on the first display screen displays a plurality of network interfaces including a first network interface; and on the right side of FIG. 7B is an interface displayed on the second display screen, and the display interface on the second display screen displays a network quality requirement of one or more candidate applications related to the first network interface. A user selects a target application (that is, a second application) from the candidate applications based on the network quality requirements of the candidate applications. When the user drags the first network interface from the left side to the target application on the right side, the first network interface is bound to the target application. It may be understood that there may be one or more target applications. This is not specifically limited herein.

Figure 7C:
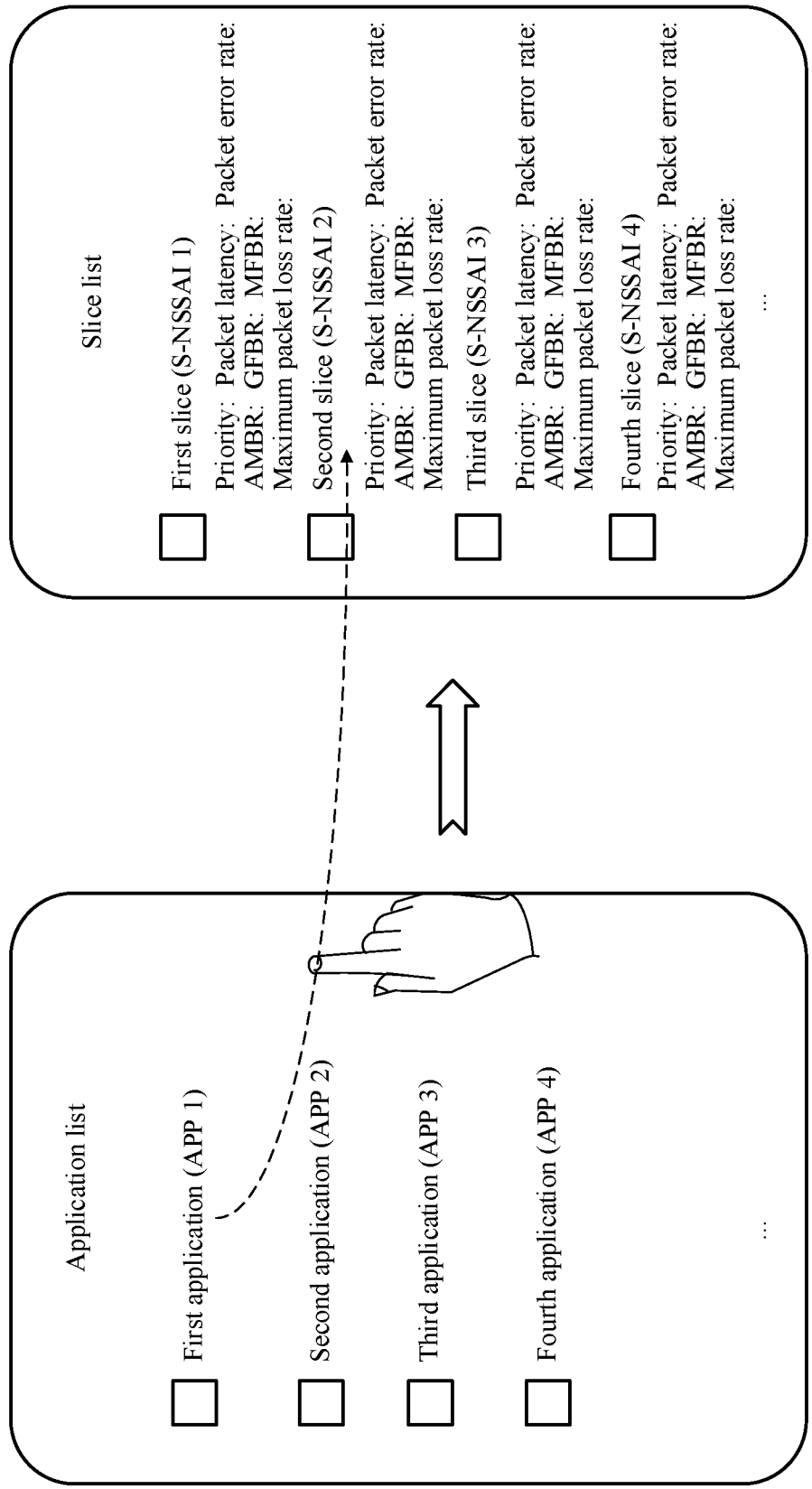

As shown in FIG. 7C, on the left side of FIG. 7C is an interface displayed on the first display screen, and the left side of the display interface on the first display screen displays a plurality of applications including the first application; and on the right side of FIG. 7C is an interface displayed on the second display screen, and the right side of the display interface on the second display screen displays a network quality indicator of one or more candidate slices related to the first application. A user selects a target slice (that is, the second slice) from the candidate slices based on the network quality indicators of the candidate slices. When the user drags the first application from the left side to the target slice on the right side, the first application is bound to the target slice. It may be understood that there may be one or more target slices. This is not specifically limited herein.

Figure 7D:
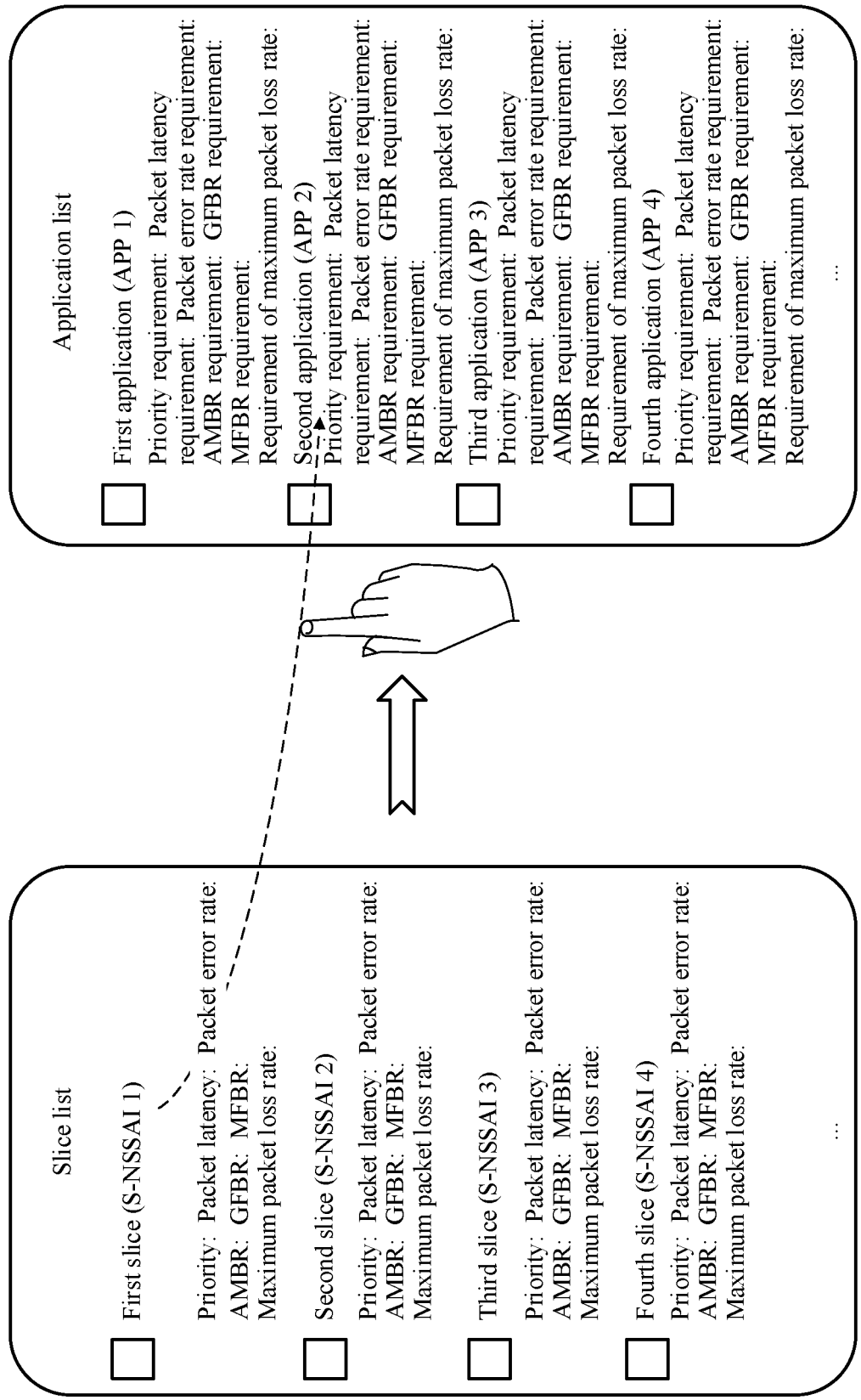

As shown in FIG. 7D, on the left side of FIG. 7D is an interface displayed on the first display screen, and the display interface on the first display screen displays a plurality of slices including the first slice; and on the right side of FIG. 7D is an interface displayed on the second display screen, and the display interface on the second display screen displays a network quality requirement of one or more candidate applications related to the first slice. A user selects a target application (that is, the second application) from the candidate applications based on the network quality requirements of the candidate applications. When the user drags the first slice from the left side to the target application on the right side, the first slice is bound to the target application. It may be understood that there may be one or more target applications. This is not specifically limited herein.

Figure 7E:
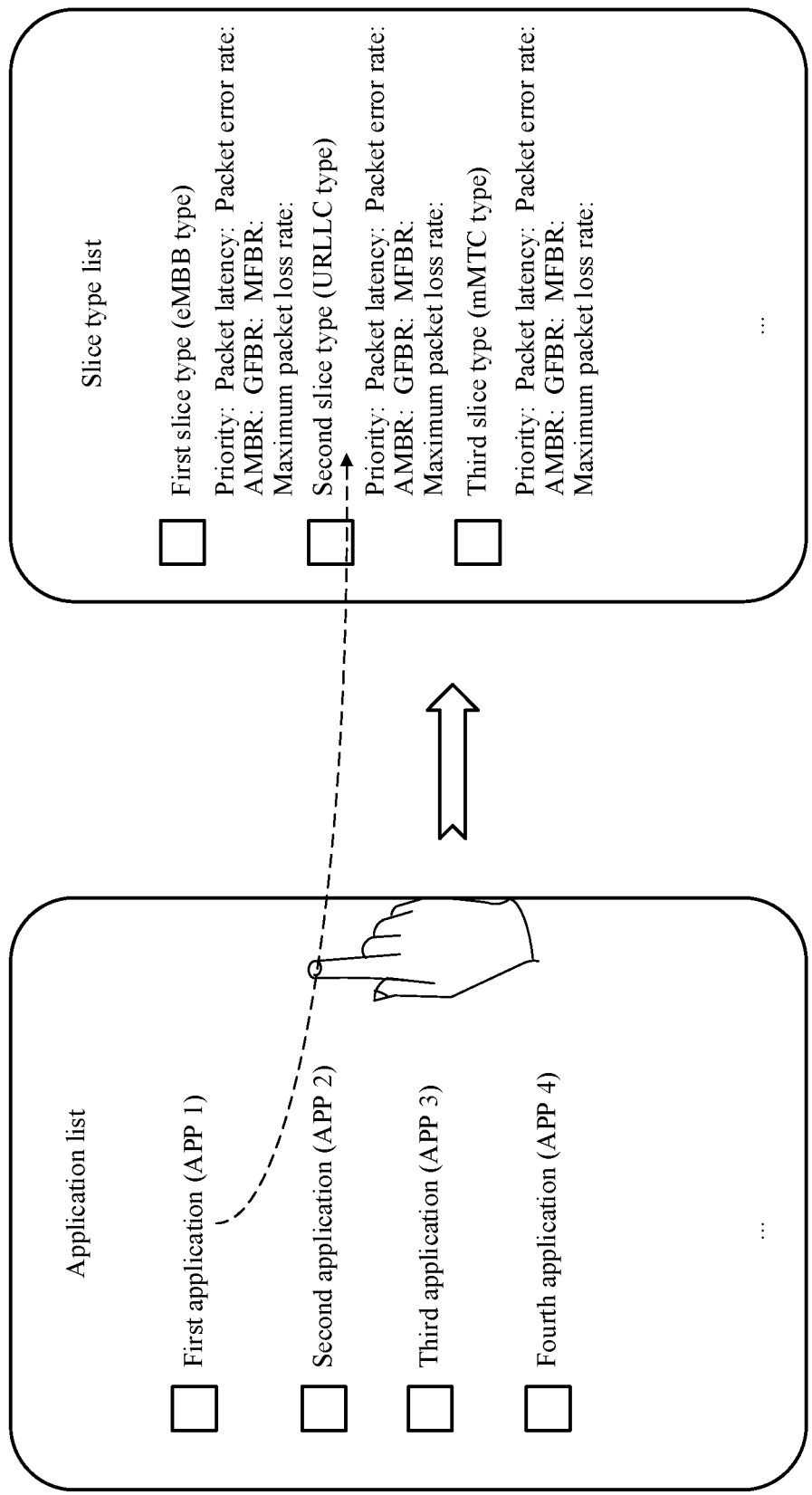

As shown in FIG. 7E, on the left side of FIG. 7E is an interface displayed on the first display screen, and the display interface on the first display screen displays a plurality of applications including the first application; and on the right side of FIG. 7E is an interface displayed on the second display screen, and the display interface on the second display screen displays a network quality indicator of one or more candidate slice types related to the first application. A user selects a target slice type (that is, a second slice type) from the candidate slice types based on the network quality indicators of the candidate slice types. When the user drags the first application from the left side to the target slice type on the right side, the first application is bound to the target slice type. It may be understood that there may be one or more target slice types. This is not specifically limited herein.

Figure 7F:
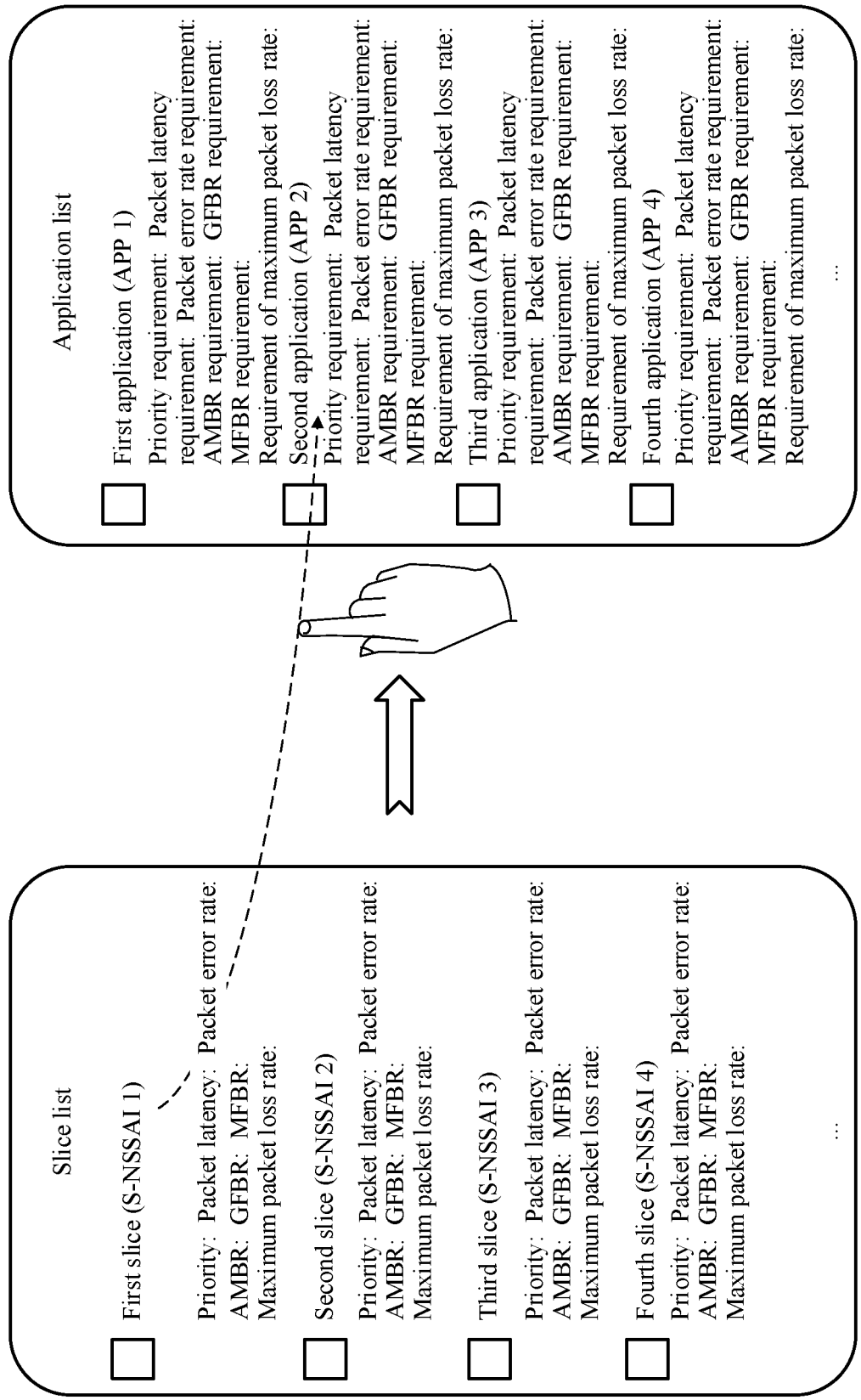

As shown in FIG. 7F, on the left side of FIG. 7F is an interface displayed on the first display screen, and the display interface on the first display screen displays a plurality of slice types including the first slice type; and on the right side of FIG. 7F is an interface displayed on the second display screen, and the display interface on the second display screen displays a network quality requirement of one or more candidate applications related to the first slice type. A user selects a target application (that is, the second application) from the candidate applications based on the network quality requirements of the candidate applications. When the user drags the first slice type from the left side to the target application on the right side, the first slice type is bound to the target application. It may be understood that there may be one or more target applications. This is not specifically limited herein.

Figure 7G:
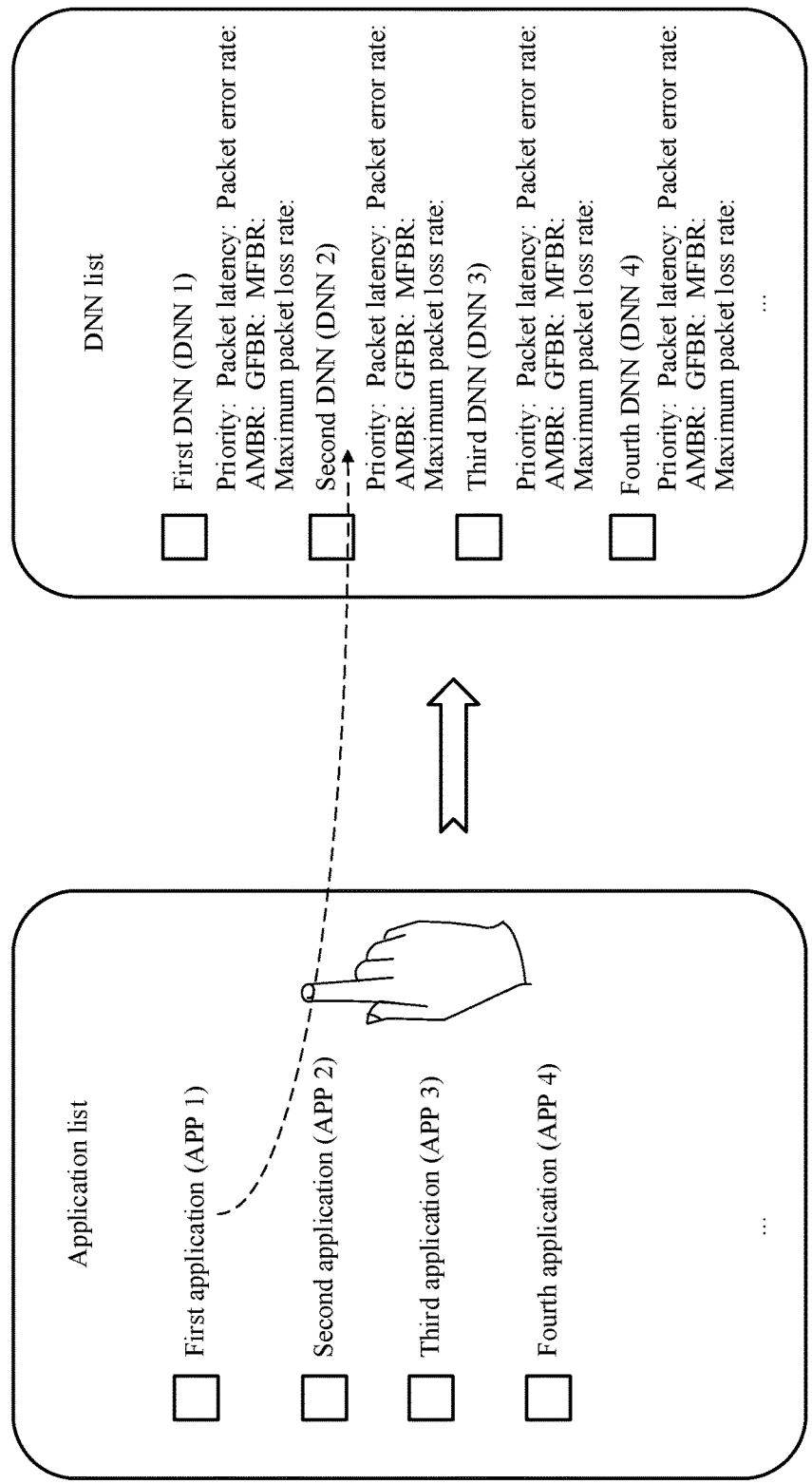

As shown in FIG. 7G, on the left side of FIG. 7G is an interface displayed on the first display screen, and the display interface on the first display screen displays a plurality of applications including the first application; and on the right side of FIG. 7G is an interface displayed on the second display screen, and the display interface on the second display screen displays a network quality indicator of one or more candidate DNNs related to the first application. A user selects a target DNN (that is, the second DNN) from the candidate DNNs based on the network quality indicators of the candidate DNNs. When the user drags the first application from the left side to the target DNN on the right side, the first application is bound to the target DNN. It may be understood that there may be one or more target DNNs. This is not specifically limited herein.

Figure 7H:
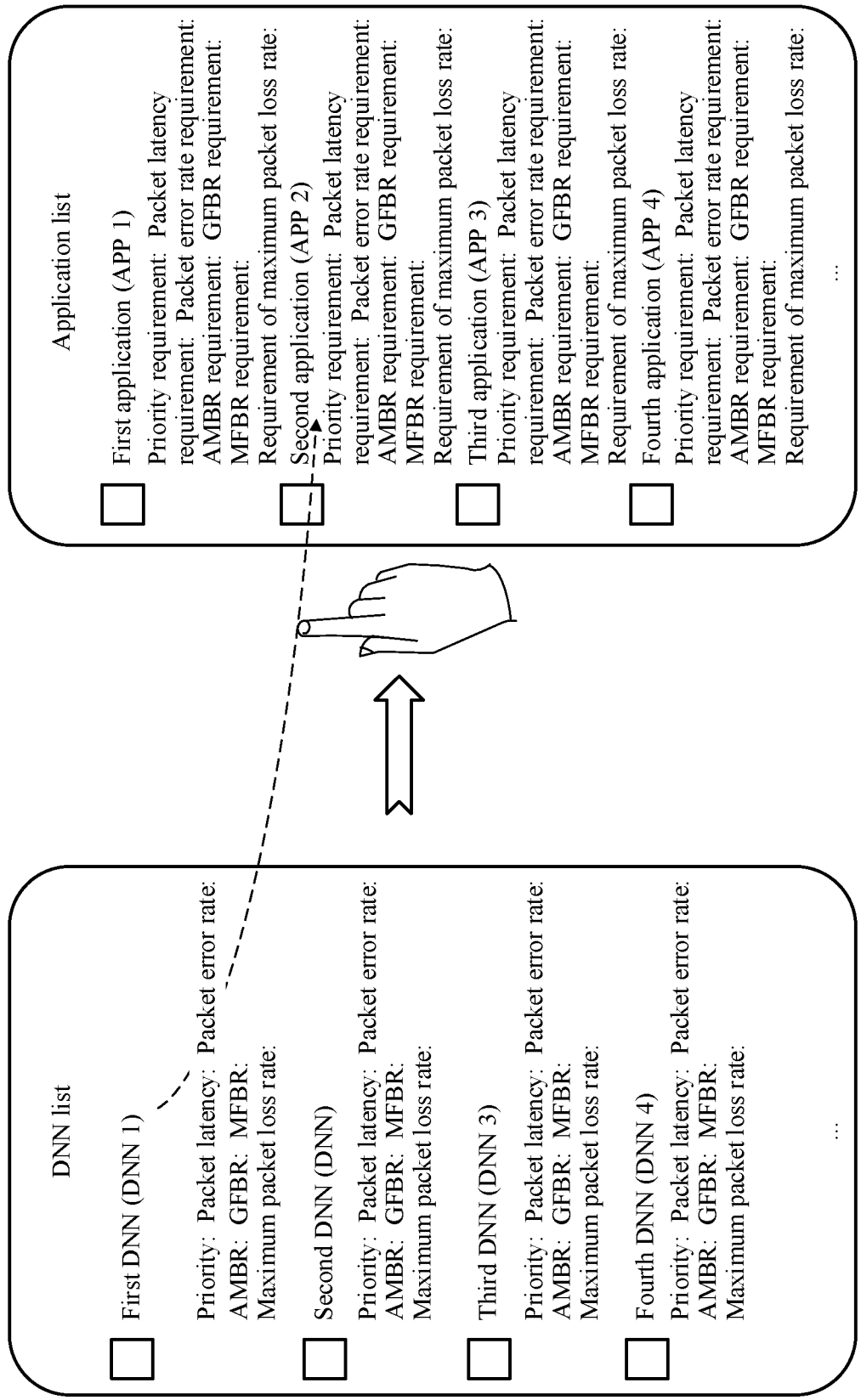

As shown in FIG. 7H, on the left side of FIG. 7H is an interface displayed on the first display screen, and the display interface on the first display screen displays a plurality of DNNs including the first DNN; and on the right side of FIG. 7H is an interface displayed on the second display screen, and the display interface on the second display screen displays a network quality requirement of one or more candidate applications related to the first DNN. A user selects a target application (that is, the second application) from the candidate applications based on the network quality requirements of the candidate applications. When the user drags the first DNN from the left side to the target application on the right side, the first DNN is bound to the target application. It may be understood that there may be one or more target applications. This is not specifically limited herein.

Figure 7I:
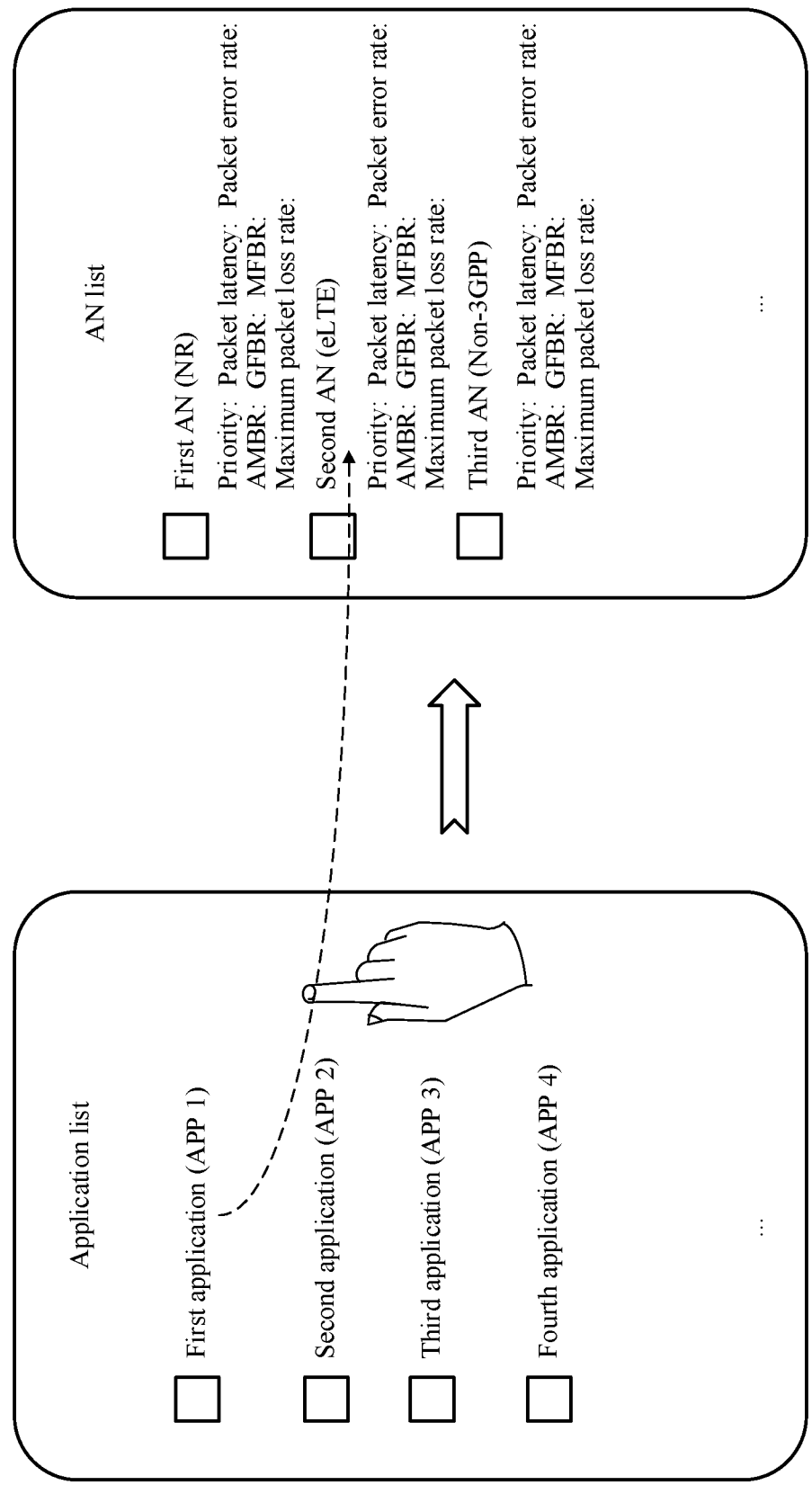

As shown in FIG. 7I, on the left side of FIG. 7I is an interface displayed on the first display screen, and the display interface on the first display screen displays a plurality of applications including the first application; and on the right side of FIG. 7I is an interface displayed on the second display screen, and the display interface on the second display screen displays a network quality indicator of one or more candidate ANs related to the first application. A user selects a target AN (that is, the eLTE) from the candidate ANs based on the network quality indicators of the candidate ANs. When the user drags the first application from the left side to the target AN on the right side, the first application is bound to the target AN. It may be understood that there may be one or more target ANs. This is not specifically limited herein.

Figure 7J:
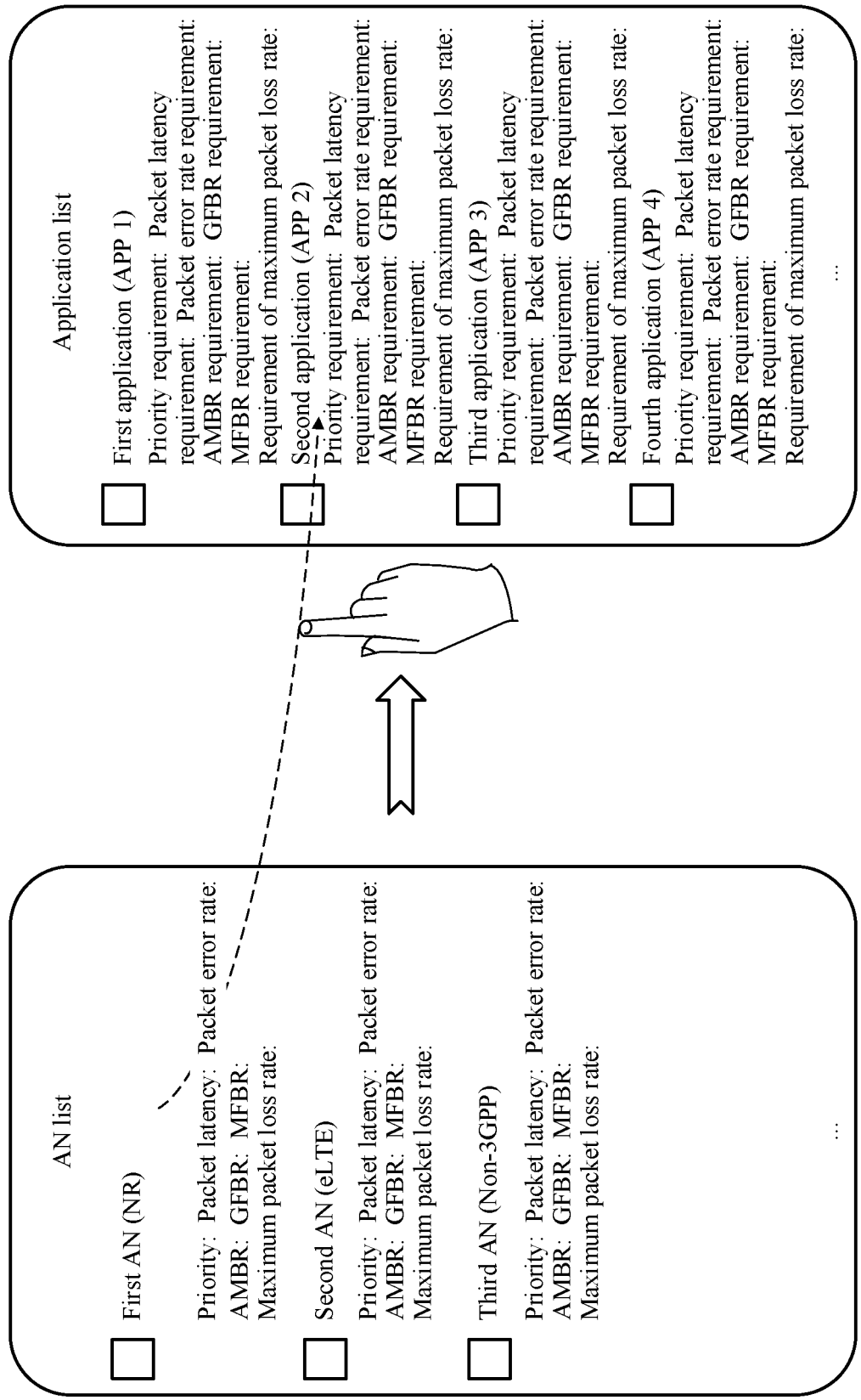

As shown in FIG. 7J, on the left side of FIG. 7J is an interface displayed on the first display screen, and the display interface on the first display screen displays a plurality of ANs including the first AN; and on the right side of FIG. 7J is an interface displayed on the second display screen, and the display interface on the second display screen displays a network quality requirement of one or more candidate applications related to the first AN. A user selects a target application (that is, the second application) from the candidate applications based on the network quality requirements of the candidate applications. When the user drags the first AN from the left side to the target application on the right side, the first AN is bound to the target application. It may be understood that there may be one or more target applications. This is not specifically limited herein.

In some embodiments, the plurality of candidate network interfaces shown in FIG. 7A are network interfaces to which the first application in FIG. 7A can be bound. That is, the candidate network interfaces do not include an application interface to which the first application cannot be bound, to avoid that the user incorrectly binds the first application to a network interface to which the first application cannot be bound. Similarly, the same applies to the candidate sessions, the candidate slices, the candidate slice types, the candidate DNNs, and the candidate ANs in FIG. 7B to FIG. 7J.

In some embodiments, the plurality of candidate network interfaces shown in FIG. 7A include a network interface to which the first application in FIG. 7A can be bound or cannot be bound. When the user incorrectly drags the first application to a network interface to which the first application cannot be bound, a prompt box pops up, prompting the user that the network interface is incorrectly bound. Similarly, the same applies to the candidate sessions, the candidate slices, the candidate slice types, the candidate DNNs, and the candidate ANs in FIG. 7B to FIG. 7J.

It may be understood that the foregoing binding between an application and a session, a network interface, a slice, a slice type, a DNN, and an AN that is implemented in a dragging manner is merely used as a specific example. In another embodiment, the binding may also be performed in another manner, for example, by manually inputting a binding relationship. This is not specifically limited herein.

Figure 8:
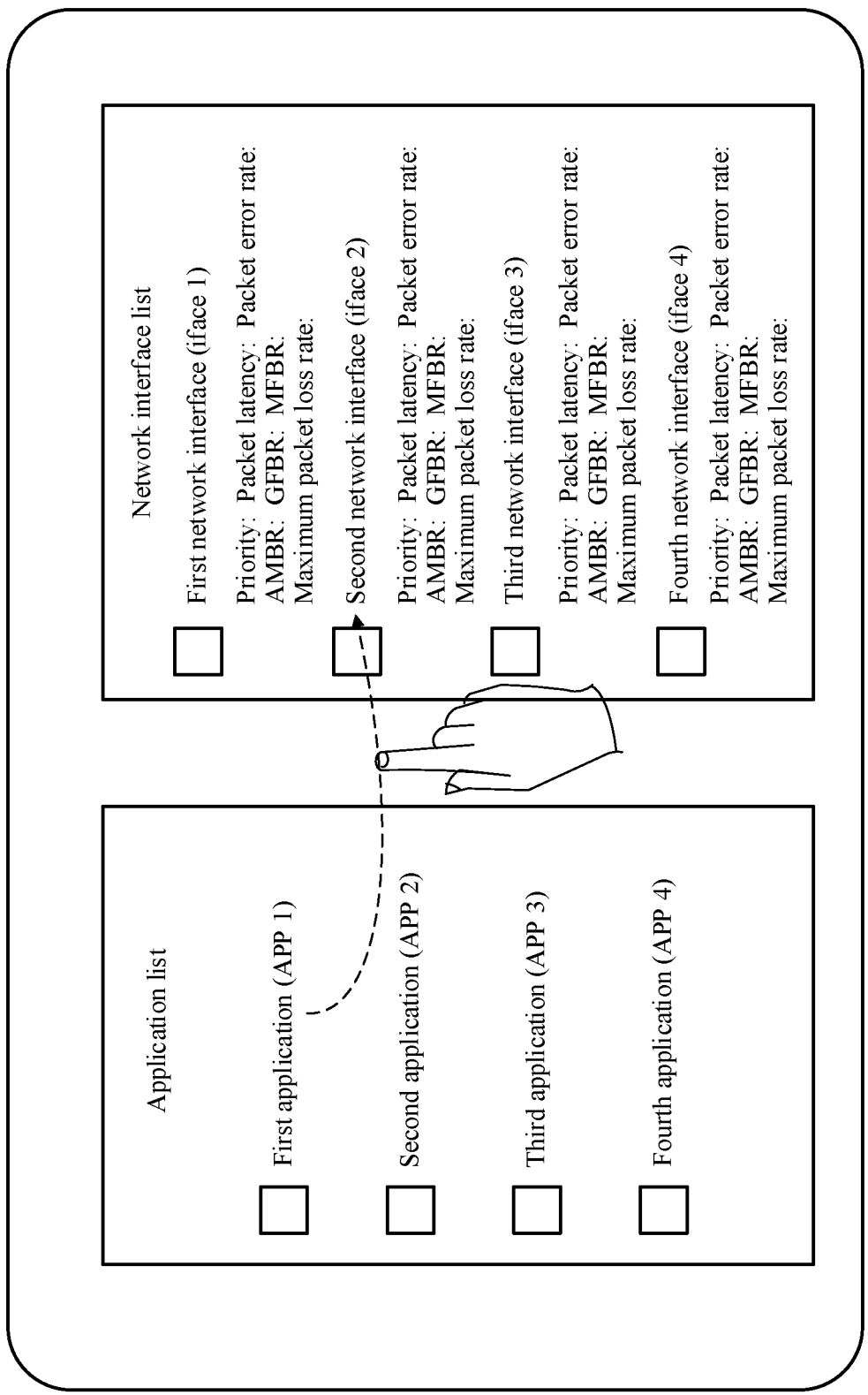
FIG. 8 is a schematic diagram of management of binding between an application and a network interface on a dual-screen terminal device according to this application.

In the foregoing embodiment shown in FIG. 7A to FIG. 7J, the dual-screen terminal device is used as an example to describe how to perform management of binding between an application and a network interface, between an application and a session, between an application and a slice, between an application and a slice type, between an application and a DNN, and between an application and an AN. In actual application, the management of binding between an application and a network interface, between an application and a session, between an application and a slice, between an application and a slice type, between an application and a DNN, and between an application and an AN may also be implemented on a single-screen terminal device. An application and a network interface are used as an example. FIG. 8 is a schematic diagram of a display interface on a screen of a terminal device. The display interface displays left and right parts of content. An application list is displayed on the left side of the display interface, and the application list includes a plurality of applications including the first application. A network interface list is displayed on the right side of the display interface, and the network interface list includes a network quality indicator of one or more candidate network interfaces related to the first application. It may be understood that the screen of the terminal device may initially display only the left part of content. After a user touch the first application in the left part of content, the screen of the terminal device displays the right part of content. The user selects a target network interface (that is, the second network interface) from the candidate network interfaces based on the network quality indicators of the candidate network interfaces. When the user drags the first application from the left side to the target network interface on the right side, the first application is bound to the target network interface.

It may be understood that, although only the management of binding between an application and a network interface is used as an example in FIG. 8, the management of binding between an application and a session, the management of binding between an application and a slice, the management of binding between an application and a slice type, the management of binding between an application and a DNN, and the management of binding between an application and an AN are similar, and details are not described herein again.

Figure 9:
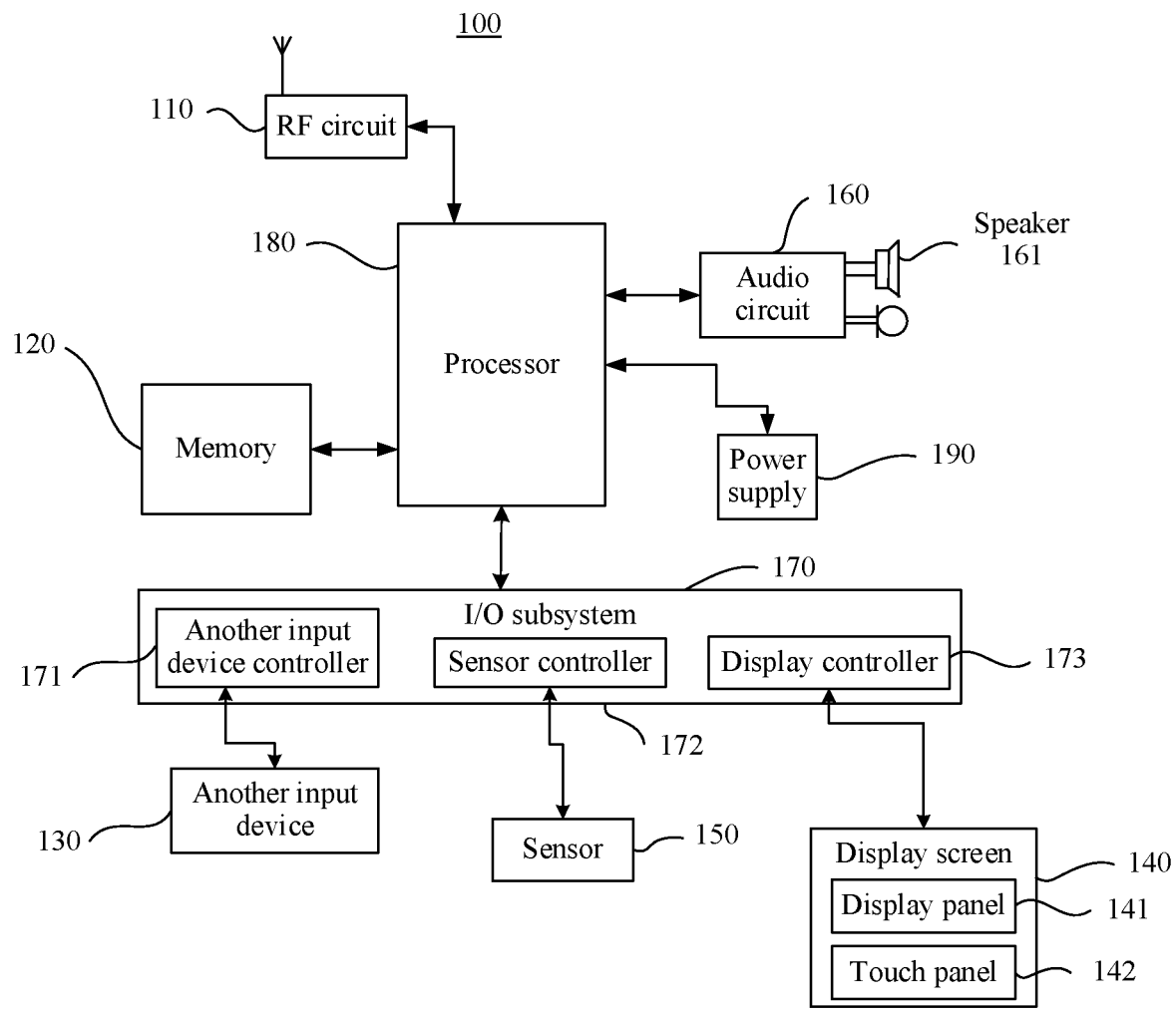
FIG. 9 is a schematic structural diagram of a terminal device according to this application.

An example is used in which the terminal device is a mobile phone. FIG. 9 is a block diagram of a partial structure of a mobile phone 100 related to an embodiment of the present invention. Referring to FIG. 9, the mobile phone 100 includes components such as a radio frequency (RF) circuit 110, a memory 120, another input device 130, a display screen 140, a sensor 150, an audio circuit 160, an I/O subsystem 170, a processor 180, and a power supply 190. A person skilled in the art may understand that the structure of the mobile phone shown in FIG. 9 does not constitute a limitation on the mobile phone, and the mobile phone may include components more or fewer than those shown in the figure, or combine some components, or split some components, or have different component arrangements. A person skilled in the art may understand that the display screen 140 belongs to a user interface (UI, User Interface), and the mobile phone 100 may include user interfaces more or fewer than those shown in the figure.

The following describes the components of the mobile phone 100 in detail with reference to FIG. 9.

The RF circuit 110 may be configured to receive and send a signal in a process of receiving and sending information or a call process. Specifically, after receiving downlink information of a base station, the RF circuit 110 sends the downlink information to the processor 180 for processing. In addition, the RF circuit 110 sends uplink data to the base station. Generally, the RF circuit includes but is not limited to an antenna, at least one amplifier, a transceiver, a coupler, a low noise amplifier (LNA), and a duplexer. In addition, the RF circuit 110 may further communicate with another device through wireless communication and a network. The wireless communication may use any communication standard or protocol, including but not limited to global system mobile (GSM), general packet radio service (GPRS), code division multile access (CDMA), wideband code division multiple access (WCDMA), long term evolusion (LTE), email, and short messaging service (SMS).

The memory 120 may be configured to store a software program and a module. By running the software program and the module that are stored in the memory 120, the processor 180 performs various functions of the mobile phone 100 and processes data. The memory 120 may mainly include a program storage area and a data storage area. The program storage area may store an operating system, an application program required by at least one function (such as a sound play function and an image play function), and the like. The data storage area may store data (such as audio data and a phone book) created when the mobile phone 100 is used, and the like. In addition, the memory 120 may include a high-speed random access memory, and may further include a nonvolatile memory, for example, at least one magnetic disk storage component and a flash memory component, or may include another volatile solid-state storage component.

The another input device 130 may be configured to receive digital or character information that is input, and generate key signal input that is related to a user setting and function control of the mobile phone 100. Specifically, the another input device 130 may include but is not limited to one or more of a physical keyboard, a function key (for example, a volume control key or an on/off key), a trackball, a mouse, a joystick, an optical mouse (the optical mouse is a touch-sensitive surface that does not display visual output, or is an extension of a touch-sensitive surface that includes a touchscreen), and the like. The another input device 130 is connected to another input device controller 171 of the I/O subsystem 170, and performs signal interaction with the processor 180 under control of the another device input controller 171.

The display screen 140 may be configured to display information entered by a user or information provided for a user, and various menus of the mobile phone 100, and may further receive user input. Specifically, the display screen 140 may include a display panel 141 and a touch panel 142. The display panel 141 may be configured in a form of an LCD (Liquid Crystal Display, liquid crystal display), an OLED (Organic Light-Emitting Diode, organic light emitting diode), or the like. The touch panel 142, also referred to as a touchscreen, a touch-sensitive screen, or the like, may collect a contact or non-contact operation performed by the user on or near the touch panel 142 (for example, an operation performed by the user on the touch panel 142 or near the touch panel 142 by using any suitable object or accessory such as a finger or a stylus, or may include a somatosensory operation, where the contact or non-contact operation includes operation types such as a single-point control operation and a multi-point control operation) and drive a corresponding connection apparatus according to a preset program. Optionally, the touch panel 142 may include two parts: a touch detection apparatus and a touch controller. The touch detection apparatus detects a touch orientation and posture of the user, detects a signal brought by a touch operation, and transfers the signal to the touch controller. The touch controller receives touch information from the touch detection apparatus, converts the touch information into information that can be processed by the processor, and then sends the information to the processor 180. The touch controller can also receive and execute a command sent by the processor 180. In addition, the touch panel 142 may be implemented by using a plurality of types such as a resistive type, a capacitive type, an infrared type, and a surface acoustic wave type, or may be implemented by using any technology developed in the future. Further, the touch panel 142 may cover the display panel 141. The user may perform, based on content displayed on the display panel 141 (the displayed content includes but is not limited to a soft keyboard, a virtual mouse, a virtual key, and an icon), an operation on or near the touch panel 142 that covers the display panel 141. After detecting the operation on or near the touch panel 142, the touch panel 142 transfers the operation to the processor 180 by using the I/O subsystem 170 to determine user input. Then, the processor 180 provides, based on the user input, corresponding visual output on the display panel 141 by using the I/O subsystem 170. In FIG. 9, the touch panel 142 and the display panel 141 are used as two independent components to implement input and output functions of the mobile phone 100. However, in some embodiments, the touch panel 142 and the display panel 141 may be integrated to implement the input and output functions of the mobile phone 100.

The mobile phone 100 may further include at least one type of sensor 150, for example, a light sensor, a motion sensor, and another sensor. Specifically, the light sensor may include an ambient light sensor and a proximity sensor. The ambient light sensor may adjust luminance of the display panel 141 based on brightness of ambient light. The proximity sensor may turn off the display panel 141 and/or backlight when the mobile phone 100 moves to an ear. As a type of motion sensor, an accelerometer sensor may detect a magnitude of acceleration in each direction (generally three axes), and may detect a magnitude and a direction of gravity in a static state. The accelerometer sensor may be used in application of recognizing a mobile phone posture (such as landscape or portrait orientation switching, a related game, or magnetometer posture calibration), a function related to vibration identification (such as a pedometer or knocking), or the like. Other sensors such as a gyroscope, a barometer, a hygrometer, a thermometer, and an infrared sensor that may be further configured for the mobile phone 100 are not described in detail herein.

The audio circuit 160, a speaker 161, and a microphone 162 may provide an audio interface between the user and the mobile phone 100. The audio circuit 160 may convert received audio data into a signal and send the signal to the speaker 161, and the speaker 161 converts the signal into a sound signal for output. On the other hand, the microphone 162 converts a collected sound signal into a signal; and after receiving the signal, the audio circuit 160 converts the signal into audio data, and then outputs the audio data to the RF circuit 108 so that the audio data can be sent to, for example, another mobile phone, or outputs the audio data to the memory 120 for further processing.

The I/O subsystem 170 is configured to control an external device for input and output, and may include the another device input controller 171, a sensor controller 172, and a display controller 173. Optionally, one or more other input control device controllers 171 receive a signal from the another input device 130 and/or send a signal to the another input device 130. The another input device 130 may include a physical button (a press button, a rocker button, or the like), a dial, a slider switch, a joystick, a click scroll wheel, and an optical mouse (the optical mouse is a touch-sensitive surface that does not display visual output, or is an extension of a touch-sensitive surface that includes a touchscreen). It should be noted that the another input control device controller 171 may be connected to any one or more of the foregoing devices. The display controller 173 in the I/O subsystem 170 receives a signal from the display screen 140 and/or sends a signal to the display screen 140. After the display screen 140 detects user input, the display controller 173 converts the detected user input into interaction with a user interface object displayed on the display screen 140, thus implementing human-machine interaction. The sensor controller 172 may receive a signal from one or more sensors 150 and/or send a signal to the one or more sensors 150.

The processor 180 is a control center of the mobile phone 100, and is connected to each part of the mobile phone 100 by using various interfaces and lines. By running or executing the software program and/or module stored in the memory 120 and invoking data stored in the memory 120, the processor 180 performs various functions of the mobile phone 100 and processes data, thus performing overall monitoring on the mobile phone. Optionally, the processor 180 may include one or more processing units. Preferably, the processor 180 may integrate an application processor and a modem processor. The application processor mainly processes an operating system, a user interface, an application program, and the like. The modem processor mainly processes wireless communication. It may be understood that the modem processor may alternatively not be integrated into the processor 180.

The mobile phone 100 may further include the power supply 190 (for example, a battery) that supplies power to each component. Preferably, the power supply may be logically connected to the processor 180 by using a power management system, to implement functions such as charging management, discharging management, and power consumption management by using the power management system.

Although not shown, the mobile phone 100 may further include a camera, a Bluetooth module, and the like. Details are not described herein.

It may be understood that the terminal device (for example, a mobile phone) may implement the foregoing traffic counting method and rate counting method. For details, refer to FIG. 1 to FIG. 8 and related descriptions. Details are not described herein again.

Figure 10A:
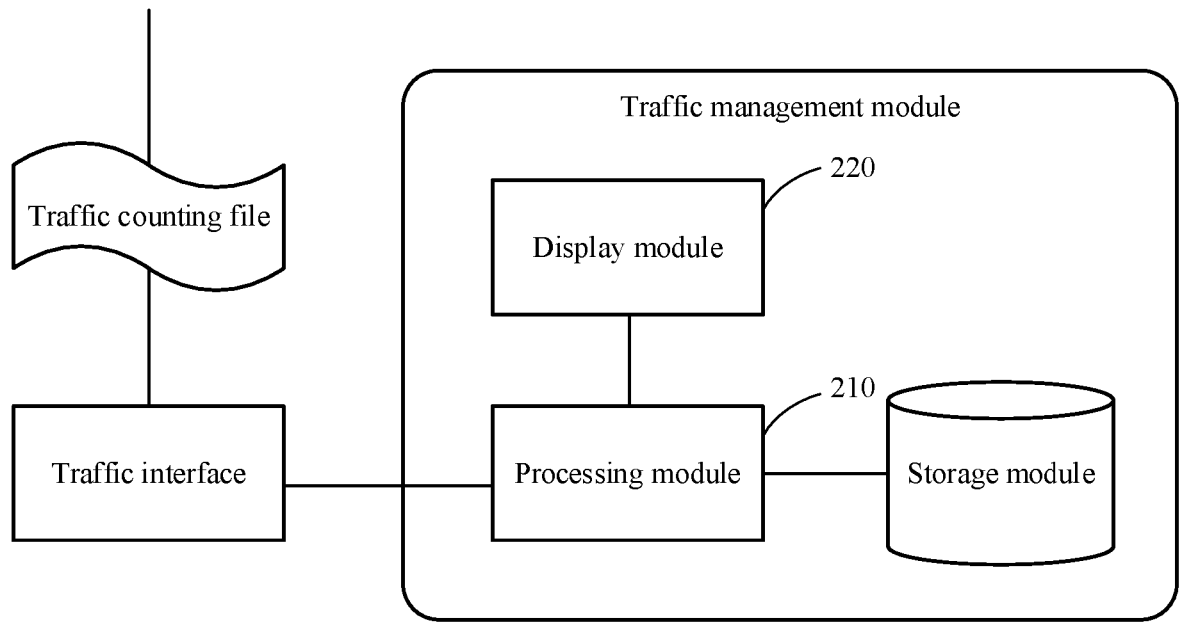
FIG. 10A and FIG. 10B are schematic structural diagrams of some other terminal devices according to this application.
Figure 10B:
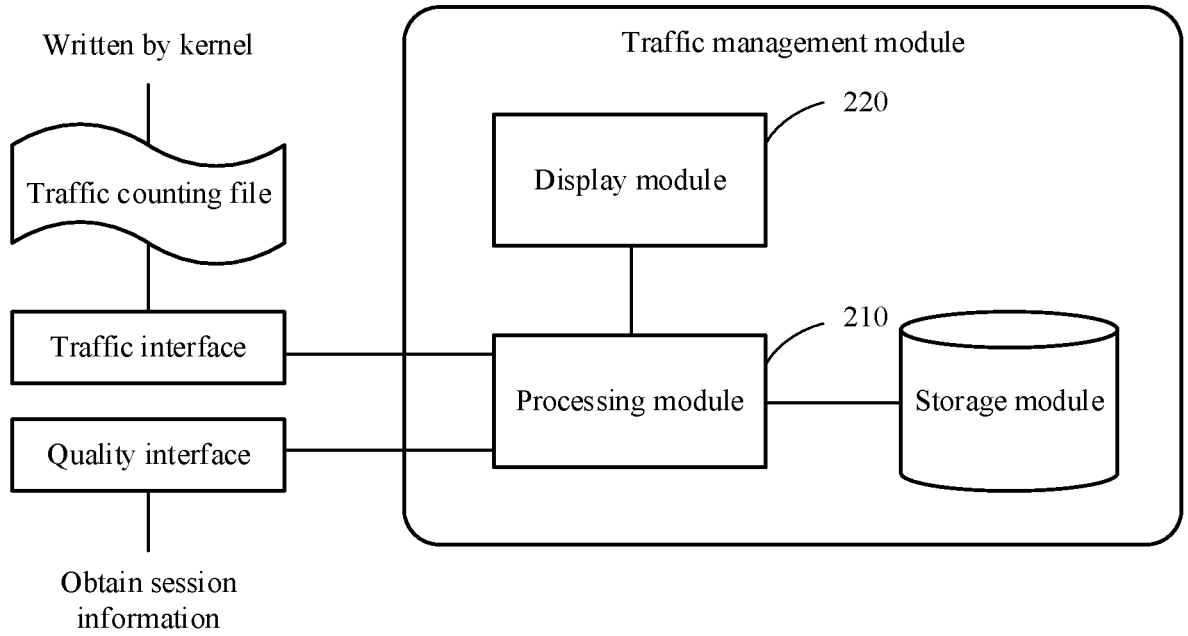

Referring to FIG. 10A to FIG. 10B, FIG. 10A to FIG. 10B are some schematic structural diagrams of a terminal device according to an embodiment of this application. As shown in FIG. 10A and FIG. 10B, the terminal device in this application includes a processing module 210 and a display module 220.

The processing module 210 is configured to obtain first session information of a first session of the terminal device, where the first session information includes any one or more types of the following information: a slice to which the first session belongs, a slice type of a slice to which the first session belongs, a data network name DNN to which the first session belongs, or an access network AN type used by the first session.

The processing module 210 is further configured to: when the first session information includes the slice to which the first session belongs, count traffic of the first session into first-slice traffic corresponding to the slice to which the first session belongs, where the slice to which the first session belongs is a first slice; or the processing module 210 is further configured to: when the first session information includes the slice type of the slice to which the first session belongs, count traffic of the first session into first-type-slice traffic corresponding to the slice type of the slice to which the first session belongs, where the slice type of the slice to which the first session belongs is a first type slice; or the processing module 210 is further configured to: when the first session information includes the DNN to which the first session belongs, count traffic of the first session into first-DNN traffic corresponding to the DNN to which the first session belongs, where the DNN to which the first session belongs is a first DNN; or the processing module 210 is further configured to: when the first session information includes the AN used by the first session, count traffic of the first session into first-AN traffic corresponding to the AN used by the first session, where the AN used by the first session is a first AN.

Optionally, the processing module 210 is further configured to: when the first session information includes the slice to which the first session belongs, the slice to which the first session belongs is the first slice, and a plurality of sessions including the first session all belong to the first slice, count traffic of the plurality of sessions into the first-slice traffic; or the processing module 210 is further configured to: when the first session information includes the slice type of the slice to which the first session belongs, the slice type of the slice to which the first session belongs is the first type slice, and a plurality of sessions including the first session all belong to the first type slice, count traffic of the plurality of sessions into the first-type-slice traffic; or the processing module 210 is further configured to: when the first session information includes the DNN to which the first session belongs, the DNN to which the first session belongs is the first DNN, and a plurality of sessions including the first session all belong to the first DNN, count traffic of the plurality of sessions into the first-DNN traffic; or the processing module 210 is further configured to: when the first session information includes the AN used by the first session, the AN used by the first session is the first AN, and a plurality of sessions including the first session all belong to the first AN, count traffic of the plurality of sessions into the first-AN traffic.

Optionally, the display module 220 is configured to display, on a display interface, network quality indicators of one or more sessions including the first session or one or more applications supported by the one or more sessions; or the display module 220 is configured to display, on a display interface, network quality indicators of one or more slices including the first slice or one or more applications supported by the one or more slices; or the display module 220 is configured to display, on a display interface, network quality indicators of one or more slice types including the first slice type or one or more applications supported by the one or more slices; or the display module 220 is configured to display, on a display interface, network quality indicators of one or more DNNs including the first DNN and one or more applications supported by the one or more DNNs; or the display module 220 is configured to display, on a display interface, network quality indicators of one or more ANs including the first AN or one or more applications supported by the one or more ANs.

Optionally, the processing module 210 is further configured to: when the applications supported by the first session are displayed on the display interface, receive a first instruction entered by a user, and deselect, according to the first instruction, some or all of the applications supported by the first session; or the processing module 210 is further configured to: when the slice to which the first session belongs is displayed on the display interface, receive a second instruction entered by a user, and deselect, according to the second instruction, some or all of the applications supported by the slice to which the first session belongs; or the processing module 210 is further configured to: when the slice type to which the first session belongs is displayed on the display interface, receive a third instruction entered by a user, and deselect, according to the third instruction, some or all of the applications supported by the slice type to which the first session belongs; or the processing module 210 is further configured to: when the DNN to which the first session belongs is displayed on the display interface, receive a fourth instruction entered by a user, and deselect, according to the fourth instruction, some or all of the applications supported by the DNN to which the first session belongs; or the processing module 210 is further configured to: when the AN to which the first session belongs is displayed on the display interface, receive a fifth instruction entered by a user, and deselect, according to the fifth instruction, some or all of the applications supported by the AN to which the first session belongs.

Optionally, the network quality indicator includes one or more of a priority, a packet latency, a packet error rate, an aggregate maximum bit rate AMBR, a guaranteed flow bit rate GFBR, a maximum flow bit rate MFBR, and a maximum packet loss rate.

Optionally, the processing module 210 is configured to obtain the traffic of the first session through a traffic interface, where the traffic interface is an original interface or a new interface.

The processing module 210 is configured to obtain network quality of the first session through a quality interface, where the quality interface is a new interface.

The "interface" in this specification may be a hardware component, a software module, or a module combining software and hardware.

Optionally, the display module 220 is further configured to display, on the display interface, network quality indicators of one or more candidate network interfaces related to a first application, where the one or more candidate network interfaces are network interfaces that can be selected for the first application; and the processing module 210 is further configured to: receive a target network interface selected by the user from the candidate network interfaces based on the network quality indicators of the candidate network interfaces, and bind the first application to the target network interface; or the display module 220 is further configured to display, on the display interface, network quality requirements of one or more candidate applications related to a first network interface, where the one or more candidate applications are applications that can be selected for the first network interface; and the processing module 210 is further configured to: receive a target application selected by the user from the candidate applications based on the network quality requirements, and bind the first network interface to the target application; or the display module 220 is further configured to display, on the display interface, network quality indicators of one or more candidate slices related to a first application, where the one or more slices are slices that can be selected for the first application; and the processing module 210 is further configured to: receive a target slice selected by the user from the candidate slices based on the network quality indicators of the candidate slices, and bind the first application to the target slice; or the display module 220 is further configured to display, on the display interface, network quality requirements of one or more candidate applications related to the first slice, where the one or more candidate applications are applications that can be selected for the first slice; and the processing module 210 is further configured to: receive a target application selected by the user from the candidate applications based on the network quality requirements, and bind the first slice to the target application; or the display module 220 is further configured to display, on the display interface, network quality indicators of one or more candidate DNNs related to a first application, where the one or more candidate DNNs are DNNs that can be selected for the first application; and the processing module 210 is further configured to: receive a target DNN selected by the user from the candidate DNNs based on the network quality indicators of the candidate DNNs, and bind the first application to the target DNN; or the display module 220 is further configured to display, on the display interface, network quality requirements of one or more candidate applications related to the first DNN, where the candidate applications are applications that can be selected for the first DNN; and the processing module 210 is further configured to: receive a target application selected by the user from the candidate applications based on the network quality requirements, and bind the first DNN to the target application; or the display module 220 is further configured to display, on the display interface, network quality indicators of one or more candidate ANs related to a first application, where the candidate ANs are ANs that can be selected for the first application; and the processing module 210 is further configured to: receive a target AN selected by the user from the candidate ANs based on the network quality indicators of the candidate ANs, and bind the first application to the target AN; or the display module 220 is further configured to display, on the display interface, network quality requirements of one or more candidate applications related to the first AN, where the candidate applications are applications that can be selected for the first AN; and the processing module 210 is further configured to: receive a target application selected by the user from the candidate applications based on the network quality requirements, and bind the first AN to the target application.

Optionally, the processing module 210 is further configured to: when the first-slice traffic is greater than or equal to or close to an upper slice traffic limit, stop using the first-slice traffic; or the processing module 210 is further configured to: when the first-type-slice traffic is greater than or equal to or close to an upper slice type traffic limit, stop using the first-type-slice traffic; or the processing module 210 is further configured to: when the first-DNN traffic is greater than or equal to or close to an upper DNN traffic limit, stop using the first-DNN traffic; or the processing module 210 is further configured to: when the first-AN traffic is greater than or equal to or close to an upper AN traffic limit, stop using the first-AN traffic.

The terminal device in this embodiment may be configured to perform the foregoing traffic counting method. For brevity, the terminal device in this embodiment of this application is not described in detail. For details, refer to the traffic counting method corresponding to FIG. 1 to FIG. 8 and related descriptions. In addition, the rate counting method is similar to the traffic counting method. Therefore, a terminal device configured to implement the rate counting method is also similar to the terminal device configured to implement the traffic counting method. Details are not described herein.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

What is claimed is:

1. A traffic counting method, comprising:
obtaining first session information of a first session of a terminal device, wherein the first session information comprises any one or more types of the following information: a slice to which the first session belongs, a slice type of a slice to which the first session belongs, a data network name DNN to which the first session belongs, or an access network AN used by the first session;
determining which one of a slice to which the first session belongs, a slice type of a slice to which the first session belongs, a data network name DNN to which the first session belongs, or an access network AN used by the first session the first session information is; and when the first session information comprises the slice to which the first session belongs, counting traffic of the first session into first-slice traffic corresponding to the slice to which the first session belongs, wherein the slice to which the first session belongs is a first slice; and when the first session information comprises the slice type of the slice to which the first session belongs, counting traffic of the first session into first-type-slice traffic corresponding to the slice type of the slice to which the first session belongs, wherein the slice type of the slice to which the first session belongs is a first type slice; and when the first session information comprises the DNN to which the first session belongs, counting traffic of the first session into first-DNN traffic corresponding to the DNN to which the first session belongs, wherein the DNN to which the first session belongs is a first DNN; and when the first session information comprises the AN used by the first session, counting traffic of the first session into first-AN traffic corresponding to the AN used by the first session, wherein the AN used by the first session is a first AN.

2. The method according to claim 1, wherein when the first session information comprises the slice to which the first session belongs, the slice to which the first session belongs is the first slice, and a plurality of sessions comprising the first session all belong to the first slice, traffic of the plurality of sessions is counted into the first-slice traffic; or when the first session information comprises the slice type of the slice to which the first session belongs, the slice type of the slice to which the first session belongs is the first type slice, and a plurality of sessions comprising the first session all belong to the first type slice, traffic of the plurality of sessions is counted into the first-type-slice traffic; or when the first session information comprises the DNN to which the first session belongs, the DNN to which the first session belongs is the first DNN, and a plurality of sessions comprising the first session all belong to the first DNN, traffic of the plurality of sessions is counted into the first-DNN traffic; or when the first session information comprises the AN used by the first session, the AN used by the first session is the first AN, and a plurality of sessions comprising the first session all belong to the first AN, traffic of the plurality of sessions is counted into the first-AN traffic.

3. The method according to claim 1, wherein the method further comprises:

displaying, on a display interface, network quality indicators of one or more sessions comprising the first session or one or more applications supported by the one or more sessions; or displaying, on a display interface, network quality indicators of one or more slices comprising the first slice or one or more applications supported by the one or more slices; or displaying, on a display interface, network quality indicators of one or more slice types comprising the first slice type or one or more applications supported by the one or more slices; or displaying, on a display interface, network quality indicators of one or more DNNs comprising the first DNN or one or more applications supported by the one or more DNNs; or displaying, on a display interface, network quality indicators of one or more ANs comprising the first AN or one or more applications supported by the one or more ANs.

4. The method according to claim 3, wherein the method further comprises:

when the applications supported by the first session are displayed on the display interface, receiving a first instruction entered by a user, and deselecting, according to the first instruction, some or all of the applications supported by the first session; or when the slice to which the first session belongs is displayed on the display interface, receiving a second instruction entered by a user, and deselecting, according to the second instruction, some or all of the applications supported by the slice to which the first session belongs; or when the slice type to which the first session belongs is displayed on the display interface, receiving a third instruction entered by a user, and deselecting, according to the third instruction, some or all of the applications supported by the slice type to which the first session belongs; or when the DNN to which the first session belongs is displayed on the display interface, receiving a fourth instruction entered by a user, and deselecting, according to the fourth instruction, some or all of the applications supported by the DNN to which the first session belongs; or when the AN to which the first session belongs is displayed on the display interface, receiving a fifth instruction entered by a user, and deselecting, according to the fifth instruction, some or all of the applications supported by the AN to which the first session belongs.

5. The method according to claim 3, wherein the network quality indicator comprises one or more of a priority, a packet latency, a packet error rate, an aggregate maximum bit rate AMBR, a guaranteed flow bit rate GFBR, a maximum flow bit rate MFBR, and a maximum packet loss rate.

6. The method according to claim 5, wherein the method further comprises:

obtaining the traffic of the first session through a traffic interface, wherein the traffic interface is an original interface or a new interface; and obtaining network quality of the first session through a quality interface, wherein the quality interface is a new interface.

7. The method according to claim 3, wherein the method further comprises:

displaying, on the display interface, network quality indicators of one or more candidate network interfaces related to a first application, wherein the one or more candidate network interfaces are network interfaces that can be selected for the first application; receiving a target network interface selected by the user from the candidate network interfaces based on the network quality indicators of the candidate network interfaces; and binding the first application to the target network interface; or displaying, on the display interface, network quality requirements of one or more candidate applications related to a first network interface, wherein the one or more candidate applications are applications that can be selected for the first network interface; receiving a target application selected by the user from the candidate applications based on the network quality requirements; and binding the first network interface to the target application; or displaying, on the display interface, network quality indicators of one or more candidate slices related to a first application, wherein the one or more slices are slices that can be selected for the first application; receiving a target slice selected by the user from the candidate slices based on the network quality indicators of the candidate slices; and binding the first application to the target slice; or displaying, on the display interface, network quality requirements of one or more candidate applications related to the first slice, wherein the one or more candidate applications are applications that can be selected for the first slice; receiving a target application selected by the user from the candidate applications based on the network quality requirements; and binding the first slice to the target application; or displaying, on the display interface, network quality indicators of one or more candidate DNNs related to a first application, wherein the one or more candidate DNNs are DNNs that can be selected for the first application; receiving a target DNN selected by the user from the candidate DNNs based on the network quality indicators of the candidate DNNs; and binding the first application to the target DNN; or displaying, on the display interface, network quality requirements of one or more candidate applications related to the first DNN, wherein the candidate applications are applications that can be selected for the first DNN; receiving a target application selected by the user from the candidate applications based on the network quality requirements; and binding the first DNN to the target application; or displaying, on the display interface, network quality indicators of one or more candidate Ans related to a first application, wherein the candidate ANs are ANs that can be selected for the first application; receiving a target AN selected by the user from the candidate ANs based on the network quality indicators of the candidate ANs; and binding the first application to the target AN; or displaying, on the display interface, network quality requirements of one or more candidate applications related to the first AN, wherein the candidate applications are applications that can be selected for the first AN; receiving a target application selected by the user from the candidate applications based on the network quality requirements; and binding the first AN to the target application.

8. The method according to claim 1, wherein the method further comprises:

when the first-slice traffic is greater than or equal to or close to an upper slice traffic limit, stopping using the first-slice traffic; or when the first-type-slice traffic is greater than or equal to or close to an upper slice type traffic limit, stopping using the first-type-slice traffic; or when the first-DNN traffic is greater than or equal to or close to an upper DNN traffic limit, stopping using the first-DNN traffic; or when the first-AN traffic is greater than or equal to or close to an upper AN traffic limit, stopping using the first-AN traffic.

9. A rate counting method, comprising:

obtaining first session information of a first session of a terminal device, wherein the first session information comprises any one or more types of the following information: a slice to which the first session belongs, a slice type of a slice to which the first session belongs, a data network name DNN to which the first session belongs, or an access network AN used by the first session;

determining which one of a slice to which the first session belongs, a slice type of a slice to which the first session belongs, a data network name DNN to which the first session belongs, or an access network AN used by the first session the first session information is; and when the first session information comprises the slice to which the first session belongs, counting a rate of the first session into first-slice rate corresponding to the slice to which the first session belongs, wherein the slice to which the first session belongs is a first slice; and when the first session information comprises the slice type of the slice to which the first session belongs, counting a rate of the first session into a first-type-slice rate corresponding to the slice type of the slice to which the first session belongs, wherein the slice type of the slice to which the first session belongs is a first type slice; and when the first session information comprises the DNN to which the first session belongs, counting a rate of the first session into a first-DNN rate corresponding to the DNN to which the first session belongs, wherein the DNN to which the first session belongs is a first DNN; and when the first session information comprises the AN used by the first session, counting a rate of the first session into a first-AN rate corresponding to the AN used by the first session, wherein the AN used by the first session is a first AN.

10. The method according to claim 9, wherein when the first session information comprises the slice to which the first session belongs, the slice to which the first session belongs is the first slice, and a plurality of sessions comprising the first session all belong to the first slice, rates of the plurality of sessions are counted into the first-slice rate; or when the first session information comprises the slice type of the slice to which the first session belongs, the slice type of the slice to which the first session belongs is the first type slice, and a plurality of sessions comprising the first session all belong to the first type slice, rates of the plurality of sessions are counted into the first-type-slice rate; or when the first session information comprises the DNN to which the first session belongs, the DNN to which the first session belongs is the first DNN, and a plurality of sessions comprising the first session all belong to the first DNN, rates of the plurality of sessions are counted into the first-DNN rate; or when the first session information comprises the AN used by the first session, the AN used by the first session is the first AN, and a plurality of sessions comprising the first session all belong to the first AN, rates of the plurality of sessions are counted into the first-AN rate.

11. The method according to claim 10, wherein the method further comprises:
- displaying, on a display interface, network quality indicators of one or more sessions comprising the first session or one or more applications supported by the one or more sessions; or
- displaying, on a display interface, network quality indicators of one or more slices comprising the first slice or one or more applications supported by the one or more slices; or
- displaying, on a display interface, network quality indicators of one or more slice types comprising the first slice type or one or more applications supported by the one or more slices; or
- displaying, on a display interface, network quality indicators of one or more DNNs comprising the first DNN or one or more applications supported by the one or more DNNs; or
- displaying, on a display interface, network quality indicators of one or more ANs comprising the first AN or one or more applications supported by the one or more ANs.

12. The method according to claim 11, wherein the method further comprises:
- when the applications supported by the first session are displayed on the display interface, receiving a first instruction entered by a user, and deselecting, according to the first instruction, some or all of the applications supported by the first session; or
- when the slice to which the first session belongs is displayed on the display interface, receiving a second instruction entered by a user, and deselecting, according to the second instruction, some or all of the applications supported by the slice to which the first session belongs; or
- when the slice type to which the first session belongs is displayed on the display interface, receiving a third instruction entered by a user, and deselecting, according to the third instruction, some or all of the applications supported by the slice type to which the first session belongs; or
- when the DNN to which the first session belongs is displayed on the display interface, receiving a fourth instruction entered by a user, and deselecting, according to the fourth instruction, some or all of the applications supported by the DNN to which the first session belongs; or
- when the AN to which the first session belongs is displayed on the display interface, receiving a fifth instruction entered by a user, and deselecting, according to the fifth instruction, some or all of the applications supported by the AN to which the first session belongs.

13. The method according to claim 11, wherein
the network quality indicator comprises one or more of a priority, a packet latency, a packet error rate, an aggregate maximum bit rate AMBR, a guaranteed flow bit rate GFBR, a maximum flow bit rate MFBR, and a maximum packet loss rate.

14. The method according to claim 11, wherein the method further comprises:
- obtaining the rate of the first session through a rate interface, wherein the rate interface is an original interface or a new interface; and
- obtaining network quality of the first session through a quality interface, wherein the quality interface is a new interface.

15. The method according to claim 11, wherein the method further comprises:
- displaying, on the display interface, network quality indicators of one or more candidate network interfaces related to a first application, wherein the one or more candidate network interfaces are network interfaces that can be selected for the first application; receiving a target network interface selected by the user from the candidate network interfaces based on the network quality indicators of the candidate network interfaces; and binding the first application to the target network interface; or
- displaying, on the display interface, network quality requirements of one or more candidate applications related to a first network interface, wherein the one or more candidate applications are applications that can be selected for the first network interface; receiving a target application selected by the user from the candidate applications based on the network quality requirements; and binding the first network interface to the target application; or
- displaying, on the display interface, network quality indicators of one or more candidate slices related to a first application, wherein the one or more slices are slices that can be selected for the first application; receiving a target slice selected by the user from the candidate slices based on the network quality indicators of the candidate slices; and binding the first application to the target slice; or
- displaying, on the display interface, network quality requirements of one or more candidate applications related to the first slice, wherein the one or more candidate applications are applications that can be selected for the first slice; receiving a target application selected by the user from the candidate applications based on the network quality requirements; and binding the first slice to the target application; or
- displaying, on the display interface, network quality indicators of one or more candidate DNNs related to a first application, wherein the one or more candidate DNNs are DNNs that can be selected for the first application; receiving a target DNN selected by the user from the candidate DNNs based on the network quality indicators of the candidate DNNs; and binding the first application to the target DNN; or
- displaying, on the display interface, network quality requirements of one or more candidate applications related to the first DNN, wherein the candidate applications are applications that can be selected for the first DNN; receiving a target application selected by the user from the candidate applications based on the network quality requirements; and binding the first DNN to the target application; or
- displaying, on the display interface, network quality indicators of one or more candidate Ans related to a first application, wherein the candidate ANs are ANs that can be selected for the first application; receiving a target AN selected by the user from the candidate ANs based on the network quality indicators of the candidate ANs; and binding the first application to the target AN; or
- displaying, on the display interface, network quality requirements of one or more candidate applications related to the first AN, wherein the candidate applications are applications that can be selected for the first AN; receiving a target application selected by the user from the candidate applications based on the network quality requirements; and binding the first AN to the target application.

16. A terminal device, comprising a processor and a memory, wherein the processor executes code in the memory, so that the terminal device performs a method comprising:
   obtaining first session information of a first session of the terminal device, wherein the first session information comprises any one or more types of the following information: a slice to which the first session belongs, a slice type of a slice to which the first session belongs, a data network name DNN to which the first session belongs, or an access network AN used by the first session;
   determining which one of a slice to which the first session belongs, a slice type of a slice to which the first session belongs, a data network name DNN to which the first session belongs, or an access network AN used by the first session the first session information is; and
   when the first session information comprises the slice to which the first session belongs, counting traffic of the first session into first-slice traffic corresponding to the slice to which the first session belongs, wherein the slice to which the first session belongs is a first slice; and
   when the first session information comprises the slice type of the slice to which the first session belongs, counting traffic of the first session into first-type-slice traffic corresponding to the slice type of the slice to which the first session belongs, wherein the slice type of the slice to which the first session belongs is a first type slice; and
   when the first session information comprises the DNN to which the first session belongs, counting traffic of the first session into first-DNN traffic corresponding to the DNN to which the first session belongs, wherein the DNN to which the first session belongs is a first DNN; and
   when the first session information comprises the AN used by the first session, counting traffic of the first session into first-AN traffic corresponding to the AN used by the first session, wherein the AN used by the first session is a first AN.

17. The terminal device according to claim 16, when the first session information comprises the slice to which the first session belongs, the slice to which the first session belongs is the first slice, and a plurality of sessions comprising the first session all belong to the first slice, traffic of the plurality of sessions is counted into the first-slice traffic; or
   when the first session information comprises the slice type of the slice to which the first session belongs, the slice type of the slice to which the first session belongs is the first type slice, and a plurality of sessions comprising the first session all belong to the first type slice, traffic of the plurality of sessions is counted into the first-type-slice traffic; or
   when the first session information comprises the DNN to which the first session belongs, the DNN to which the first session belongs is the first DNN, and a plurality of sessions comprising the first session all belong to the first DNN, traffic of the plurality of sessions is counted into the first-DNN traffic; or
   when the first session information comprises the AN used by the first session, the AN used by the first session is the first AN, and a plurality of sessions comprising the first session all belong to the first AN, traffic of the plurality of sessions is counted into the first-AN traffic.

18. The terminal device according to claim 16, wherein the processor executes code in the memory, the terminal device further performs the method comprises:
   displaying, on a display interface, network quality indicators of one or more sessions comprising the first session or one or more applications supported by the one or more sessions; or
   displaying, on a display interface, network quality indicators of one or more slices comprising the first slice or one or more applications supported by the one or more slices; or
   displaying, on a display interface, network quality indicators of one or more slice types comprising the first slice type or one or more applications supported by the one or more slices; or
   displaying, on a display interface, network quality indicators of one or more DNNs comprising the first DNN or one or more applications supported by the one or more DNNs; or
   displaying, on a display interface, network quality indicators of one or more ANs comprising the first AN or one or more applications supported by the one or more ANs.

19. The terminal device according to claim 18, wherein the processor executes code in the memory, the terminal device further performs the method comprises:
   when the applications supported by the first session are displayed on the display interface, receiving a first instruction entered by a user, and deselecting, according to the first instruction, some or all of the applications supported by the first session; or
   when the slice to which the first session belongs is displayed on the display interface, receiving a second instruction entered by a user, and deselecting, according to the second instruction, some or all of the applications supported by the slice to which the first session belongs; or
   when the slice type to which the first session belongs is displayed on the display interface, receiving a third instruction entered by a user, and deselecting, according to the third instruction, some or all of the applications supported by the slice type to which the first session belongs; or
   when the DNN to which the first session belongs is displayed on the display interface, receiving a fourth instruction entered by a user, and deselecting, according to the fourth instruction, some or all of the applications supported by the DNN to which the first session belongs; or
   when the AN to which the first session belongs is displayed on the display interface, receiving a fifth instruction entered by a user, and deselecting, according to the fifth instruction, some or all of the applications supported by the AN to which the first session belongs.

20. The terminal device according to claim 18, wherein the network quality indicator comprises one or more of a priority, a packet latency, a packet error rate, an aggregate maximum bit rate AMBR, a guaranteed flow bit rate GFBR, a maximum flow bit rate MFBR, and a maximum packet loss rate.

* * * * *